(12) United States Patent
Noguchi

(10) Patent No.: US 10,198,129 B2
(45) Date of Patent: Feb. 5, 2019

(54) INPUT DEVICE, IMAGE FORMING APPARATUS, AND NON-TRANSITORY COMPUTER READABLE MEDIUM

(71) Applicant: FUJI XEROX CO., LTD., Tokyo (JP)

(72) Inventor: Nozomi Noguchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/689,873

(22) Filed: Aug. 29, 2017

(65) Prior Publication Data

US 2018/0275829 A1 Sep. 27, 2018

(30) Foreign Application Priority Data

Mar. 21, 2017 (JP) ................................ 2017-054825

(51) Int. Cl.
*G06F 3/12* (2006.01)
*G06F 3/042* (2006.01)
*H04N 1/00* (2006.01)

(52) U.S. Cl.
CPC ....... *G06F 3/0421* (2013.01); *H04N 1/00411* (2013.01); *H04N 1/00424* (2013.01); *G06F 2203/04104* (2013.01); *H04N 2201/0094* (2013.01)

(58) Field of Classification Search
CPC ........... H04N 1/00411; H04N 1/00424; H04N 2201/0094; G06F 3/04855; G06F 2203/04104; G06F 2203/04108
See application file for complete search history.

(56) References Cited

U.S. PATENT DOCUMENTS

| 2004/0153297 | A1* | 8/2004 | Furumoto | G06F 17/5086 703/7 |
| 2007/0052693 | A1 | 3/2007 | Watari | |
| 2007/0081185 | A1* | 4/2007 | Nagatani | G03G 15/5016 358/1.15 |
| 2009/0058882 | A1* | 3/2009 | Adachi | G06F 1/1622 345/650 |
| 2009/0244357 | A1* | 10/2009 | Huang | H04N 5/23212 348/345 |
| 2013/0107297 | A1* | 5/2013 | Nishiura | H04N 1/60 358/1.9 |

(Continued)

FOREIGN PATENT DOCUMENTS

JP 2007-65767 A 3/2007

*Primary Examiner* — Moustapha Diaby
(74) *Attorney, Agent, or Firm* — Oliff PLC

(57) ABSTRACT

An input device includes multiple operators disposed in a visible state on an operation surface, a protrusion protruding from the operation surface, and a detector that detects an input of an operation performed on each of the operators when a detection position of an input object is included in a detection range set for each operator. The multiple operators include a first operator disposed near the protrusion and a second operator disposed at a position farther away from the protrusion than the first operator. An extension amount by which the detection range for the first operator is extended in a direction away from the protrusion from a visible position of the first operator is set to be larger than an extension amount by which the detection range for the second operator is extended in the direction away from the protrusion.

15 Claims, 21 Drawing Sheets

(56) References Cited

U.S. PATENT DOCUMENTS

| | | | | |
|---|---|---|---|---|
| 2013/0182291 A1* | 7/2013 | Kawai | ................... | H04N 1/448 |
| | | | | 358/3.28 |
| 2014/0146085 A1* | 5/2014 | Takeda | ................. | G06F 1/1632 |
| | | | | 345/648 |
| 2017/0201639 A1* | 7/2017 | Saka | ................. | H04N 1/00514 |

* cited by examiner

INPUT DEVICE, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-054825 filed Mar. 21, 2017.

BACKGROUND

Technical Field

The present invention relates to input devices, image forming apparatuses, and non-transitory computer readable media.

SUMMARY

According to an aspect of the invention, there is provided an input device including multiple operators disposed in a visible state on an operation surface, a protrusion protruding from the operation surface, and a detector that detects an input of an operation performed on each of the operators when a detection position of an input object is included in a detection range set for each operator. The multiple operators include a first operator disposed near the protrusion and a second operator disposed at a position farther away from the protrusion than the first operator. An extension amount by which the detection range for the first operator is extended in a direction away from the protrusion from a visible position of the first operator is set to be larger than an extension amount by which the detection range for the second operator is extended in the direction away from the protrusion.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described in detail below with reference to the drawings.

First Exemplary Embodiment

An image forming apparatus will be described here as an example. The image forming apparatus according to this exemplary embodiment forms an image onto a recording medium (which may sometimes be representatively referred to as "sheet" hereinafter) and has a copying function, a scanning function, a facsimile transmitting-receiving function, and a printing function. The image forming apparatus does not necessarily have to be equipped with all of these functions and may be an apparatus specialized in any one of the functions, such as a photocopier, a scanner, a facsimile transmitter-receiver, or a printer (including a three-dimensional printer).

Overall Configuration of Image Forming Apparatus

Figure 1:
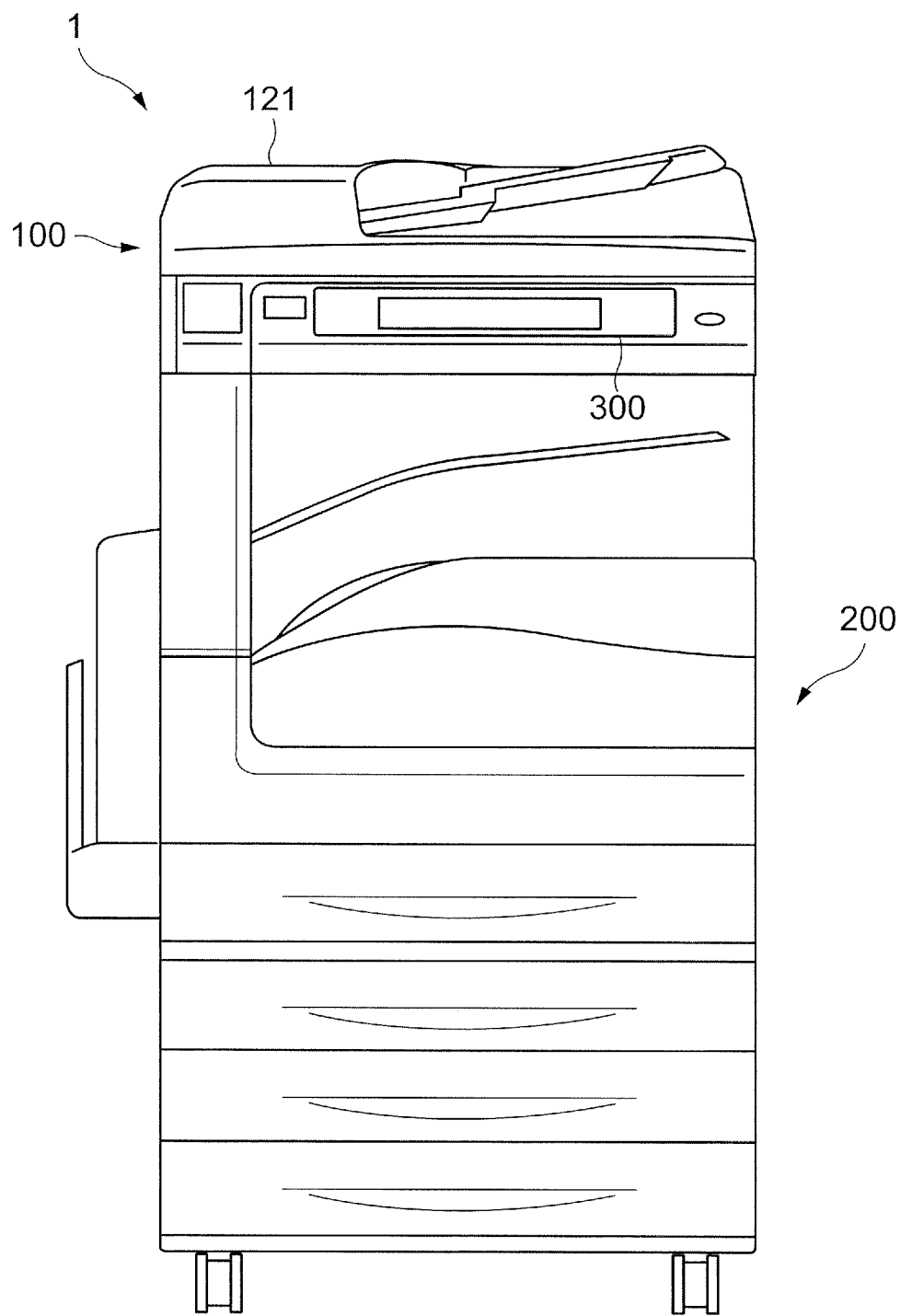
FIG. 1 is an external view of an image forming apparatus according to a first exemplary embodiment.
Figure 2:
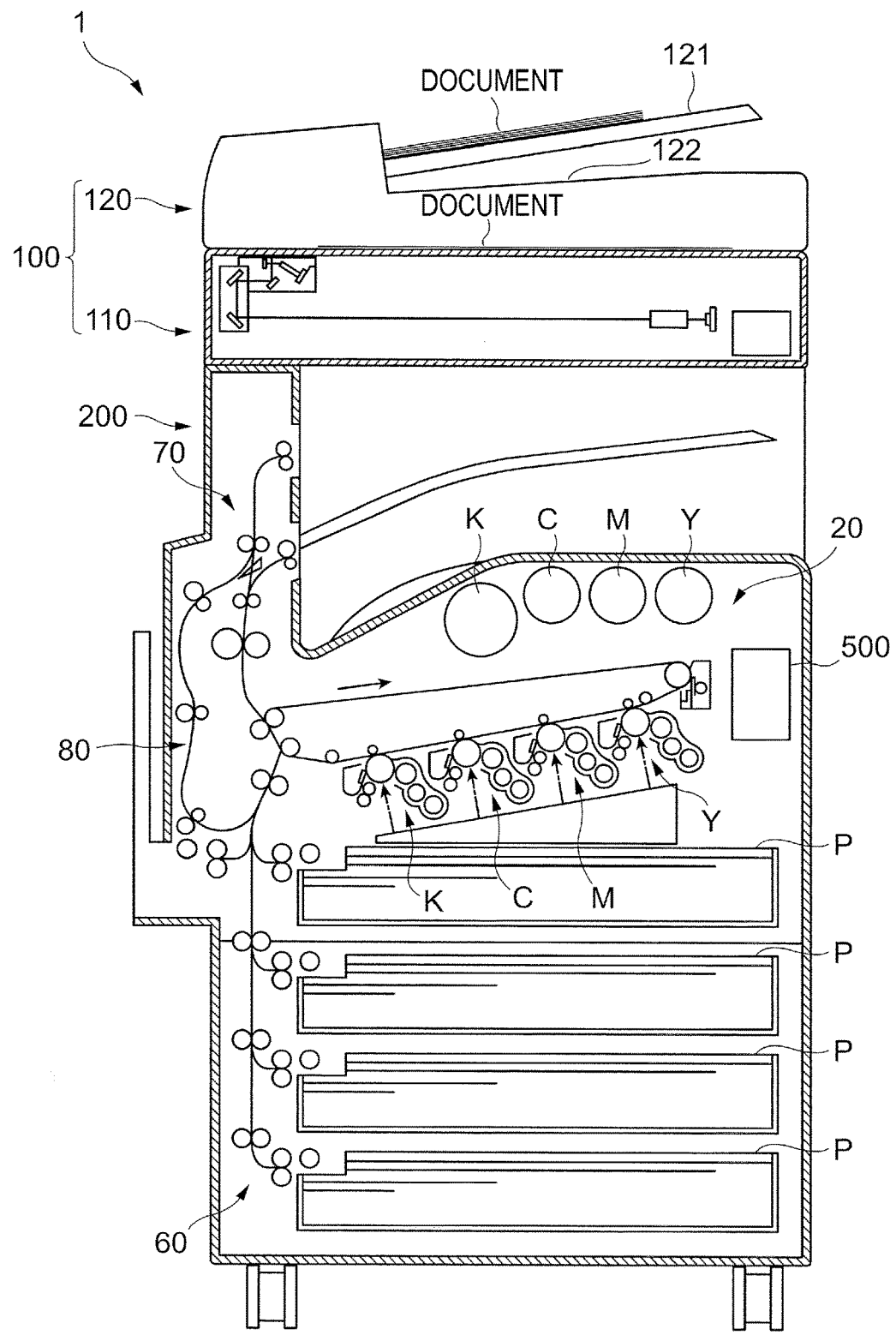
FIG. 2 illustrates the internal structure of the image forming apparatus according to the first exemplary embodiment.

FIG. 1 is an external view of an image forming apparatus 1 according to a first exemplary embodiment. FIG. 2 illustrates the internal structure of the image forming apparatus 1 according to the first exemplary embodiment.

The image forming apparatus 1 includes an image reading device 100 that reads an image of a document and an image recording device 200 that records the image onto a recording medium. The image forming apparatus 1 also includes a user interface (UI) 300 that receives an operation input by a user and displays various types of information to the user. Moreover, the image forming apparatus 1 includes a controller 500 that controls the overall operation of the image forming apparatus 1. The controller 500 is an example of a detector.

The image reading device 100 is disposed at an upper portion of the image forming apparatus 1. The image recording device 200 is disposed below the image reading device 100 and contains the controller 500 therein. The user interface 300 is disposed at the front side of the upper portion of the image forming apparatus 1, that is, at the front side of an image reading unit 110, which will be described later, of the image reading device 100.

First, the image reading device 100 will be described.

The image reading device 100 includes the image reading unit 110 that reads an image of a document and a document transport unit 120 that transports the document to the image reading unit 110. The document transport unit 120 is disposed at an upper portion of the image reading device 100, and the image reading unit 110 is disposed at a lower portion of the image reading device 100.

The document transport unit 120 has a document accommodating section 121 that accommodates a document or documents and a document output section 122 to which a document transported from the document accommodating section 121 is output, and transports the document from the document accommodating section 121 to the document output section 122. The document transport unit 120 is also called an auto document feeder (ADF).

Next, the image recording device 200 will be described.

The image recording device 200 includes an image forming unit 20 that forms an image onto a sheet P, a sheet feeding unit 60 that feeds the sheet P to the image forming unit 20, a sheet output unit 70 that outputs the sheet P having an image formed thereon at the image forming unit 20, and an inversion transport unit 80 that inverts the front and rear faces of the sheet P having the image formed on one face thereof at the image forming unit 20 and transports the sheet P again toward the image forming unit 20.

The user interface 300 is an example of an input unit (i.e., input device) used for inputting a user command to the apparatus (i.e., the image forming apparatus 1) and includes a display unit and an operation receiving unit, which will be described in detail later. The display unit displays a screen for providing various types of information and also displays software buttons associated with individual functions. The operation receiving unit has, for example, a function of detecting an operation performed on a hardware button and a function of detecting an operation performed on a software button.

In a case where an optical detector is to be used as an operation detecting unit, a spatial region outside the display unit may be used as a detection region so long as the region is within an optically detectable range. For example, an operation performed on a symbol printed on the surface of the housing may also be detected similarly to a software button displayed on the display unit.

Basic Operation of Image Forming Apparatus

The image forming apparatus 1 operates in the following manner.

For example, the image forming apparatus 1 is capable of copying a document. Specifically, the image forming apparatus 1 supplies image data of a document read by the image reading device 100 to the image recording device 200 so as to form the image of the document onto a sheet P.

Furthermore, the image forming apparatus 1 may receive a print job from, for example, a personal computer (PC) (not shown) connected to a communication line and form a received image onto a sheet P. Specifically, the image forming apparatus 1 transmits image data contained in the print job received via the communication line to the image recording device 200 so as to form the image onto the sheet P.

Moreover, the image forming apparatus 1 is capable of performing facsimile transmission and reception. Specifically, the image forming apparatus 1 may transmit image data of a document read by the image reading device 100 via the communication line.

Furthermore, the image forming apparatus 1 is capable of storing image data of a document. Specifically, the image forming apparatus 1 may store the image data of the document in the apparatus or in the PC connected via the communication line.

Configuration of Controller and Other Devices

Figure 3:
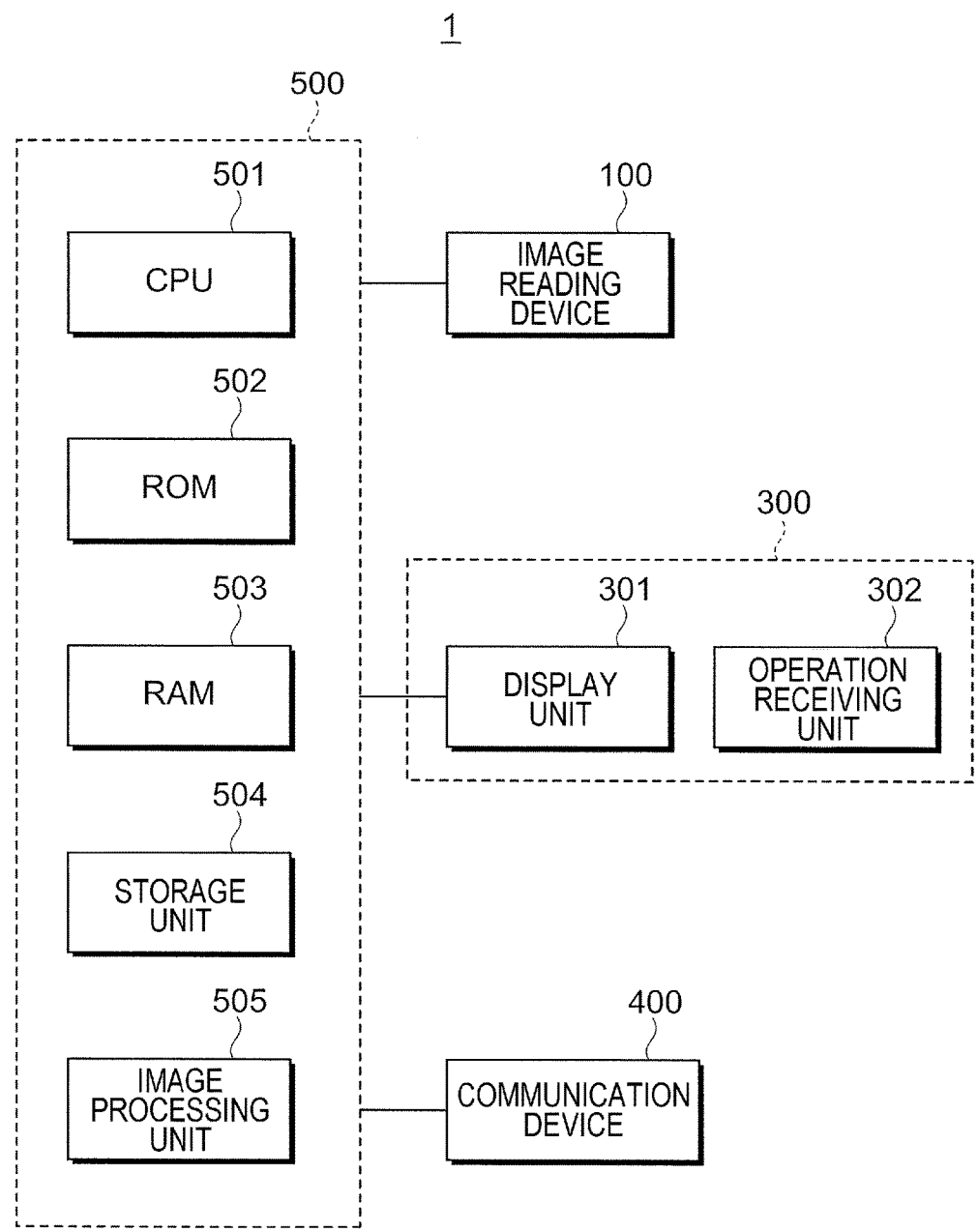
FIG. 3 illustrates an example of a functional block configuration of a controller and other devices constituting the image forming apparatus.

FIG. 3 illustrates an example of a functional block configuration of the controller 500 and other devices constituting the image forming apparatus 1.

The controller 500 includes a control unit that controls the entire apparatus (i.e., a central processing unit (CPU) 501, a read-only memory (ROM) 502, and a random access memory (RAM) 503), a storage unit 504 used for storing, for example, image data, and an image processing unit 505 that performs image processing, such as color correction and gradation correction, on an image expressed by image data. The controller 500 is an example of an information processing device.

The CPU 501 uses the RAM 503 as a work area and executes a program read from the ROM 502.

The storage unit 504 is formed of, for example, a hard disk device or a semiconductor memory and stores data related to a document image read by the image reading device 100 or an image received via a communication device 400. The storage unit 504 is also used for storing a program, where appropriate.

The image processing unit 505 is configured as, for example, a dedicated processor or a processing board and executes image processing, such as color correction and gradation correction.

The user interface 300 includes a display unit 301 used for displaying, for example, an operation screen and an operation receiving unit 302 that receives an operation input by a user. The operation receiving unit 302 is an example of a detector.

The display unit 301 is formed of, for example, a liquid-crystal display panel or an organic electroluminescence (EL) display panel.

The operation receiving unit 302 may be, for example, a contact-type coordinate input device or a noncontact-type coordinate input device. Specifically, a contact-type coordinate input device detects a change in physical quantity occurring due to a physical contact with a hardware button, such as a button or a switch, or a physical contact between an input object, such as a finger or a pen, and an operation screen (i.e., detection region), and detects the coordinate position in contact with the input object based on the detected information. A noncontact-type coordinate input device detects, in a noncontact manner, the coordinate position of an input object moving across a detection plane constituted of, for example, infrared light. An input object is an object used when making a certain command to the input device and may be, for example, a finger or a pen.

Examples of the detection method of the contact-type coordinate input device include a matrix switch method in which an electrode group arranged in the row direction and an electrode group arranged in the column direction are disposed in two upper and lower layers and in which a contact position is detected as a current-application position, a resistive film method in which two transparent electrode films (i.e., thin films functioning as resistive films) are disposed in two upper and lower layers and in which a contact position is detected based on a voltage value, a surface acoustic wave method in which vibrational waves are generated from piezoelectric elements disposed at multiple corners of a substrate, such as glass, and in which a contact position is detected based on the reflection time of the vibrational waves, an electromagnetic induction method in which a dedicated pen called an electronic pen is used, and an electrostatic capacitance method in which a contact position is detected based on a change in electrostatic capacitance occurring between a fingertip and an electroconductive film.

The contact-type coordinate input device is disposed over the surface of the display unit 301.

On the other hand, the noncontact-type coordinate input device has a light-emitting element (light source) that emits infrared light forming an optical detection plane (detection region), and also has a sensor unit that detects the position of an input object moving across the detection plane. The sensor unit may be of a type that uses imaging cameras or a type that uses light-receiving elements. For example, in the case of the type that uses imaging cameras, the imaging cameras are disposed at opposite ends of one of the sides that constitute the detection plane. In the case where light-receiving elements, such as photodiodes (PDs), are used, there are a method in which the light-receiving elements are disposed at positions facing light-emitting elements, such as light-emitting diodes (LEDs), and a method in which the light-receiving elements and the light-emitting elements are alternately arranged in a single line.

In either case, the noncontact-type coordinate input device is disposed along at least one side of the display unit 301. In this case, the length of one side of the noncontact-type coordinate input device is set in accordance with the target region to be detected. Normally, the length of one side of the noncontact-type coordinate input device is larger than the length of one side of the display unit 301.

The communication device 400 is formed of, for example, a modem or a local-area-network (LAN) interface and is used for facsimile communication or for communication with an external device.

Operation-Input-Detection Functional Unit

Next, an operation-input-detection functional unit realized in accordance with cooperation between the user interface 300 and the controller 500 (i.e., the CPU 501) will be described. The operation-input-detection functional unit is an example of a function provided by the input device and is realized in accordance with cooperation between the user interface 300 and the controller 500 (i.e., the CPU 501). Alternatively, the operation-input-detection functional unit may be realized as a function of the user interface 300 alone.

In this exemplary embodiment, the controller 500 functioning as an input device receives information related to the position and movement of an input object in the detection region (e.g., an output column of detection coordinates) from the operation receiving unit 302 and detects the contents of an operation input by the user based on the positional relationship with individual detection ranges allocated to operators (e.g., software buttons and display items) to be operated by the user. The operators are targets of operations to be input by the user and are visible to the user. Moreover, by operating any one of the operators, the user is capable of inputting a certain kind of operation. The operators may be physically provided in the input device (e.g., in the form of buttons) or may be symbols or pictures (e.g., in the form of icons) displayed on the display screen.

In this exemplary embodiment, the detection region is a range in which the coordinates (i.e., input coordinates) of an input object are detectable by the coordinate input device. Needless to say, the detection region includes detection ranges corresponding to the individual operators.

Figure 4:
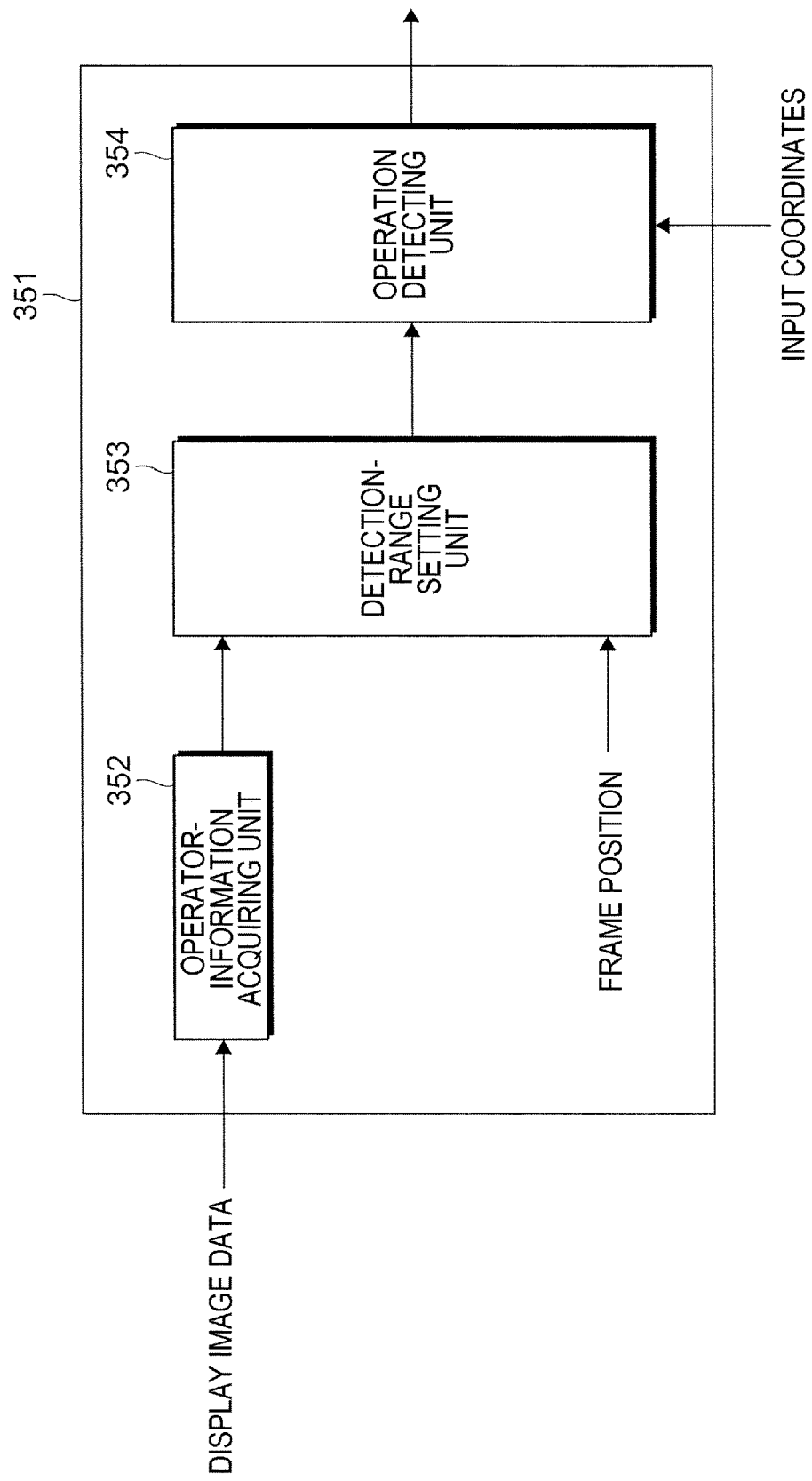
FIG. 4 illustrates an operation-input-detection functional unit used in the first exemplary embodiment.

FIG. 4 illustrates an operation-input-detection functional unit 351 used in the first exemplary embodiment.

In FIG. 4, it is assumed that a contact-type coordinate input device is used as the operation receiving unit 302. In this case, since the operation receiving unit 302 is disposed on the front surface of the display unit 301, the display region of the display unit 301 matches the input-object detection region of the operation receiving unit 302.

Furthermore, it is assumed that a frame (see FIG. 6) is disposed so as to extend along the four sides of the display unit 301. The frame is an example of a protrusion in that it protrudes from the display unit 301 as an operation surface.

The software buttons as an example of operators include displayed buttons and tabs to which individual functions are allocated. Furthermore, display items as an example of operators include, for example, individual rows and columns displayed in the form of a list, as well as hyperlinked descriptions.

The operation-input-detection functional unit 351 has an operator-information acquiring unit 352 that acquires operator information based on display image data (such as information about a displayed page and layout information within a page), a detection-range setting unit 353 that sets a detection range for each operator on the screen based on the operator information and the frame position, and an operation detecting unit 354 that detects an operation by comparing each set detection range with the coordinates (i.e., input coordinates) where an input object is detected.

The operator information contains, for example, the contents, the position, and the display size of each operator. The operator information is set in accordance with the display image displayed on the display unit 301.

The detection-range setting unit 353 provides a function of setting the detection ranges of the individual operators in accordance with the positional relationship between the individual operators and the frame, specifically, in accordance with the positional relationship between the positions of the visible operators and the frame.

In this exemplary embodiment, since the installation positions of the display unit 301 and the frame are fixed, the positional relationship between the orientation of the display image (i.e., the upper side of the display) and the frame is predetermined.

Figure 5:
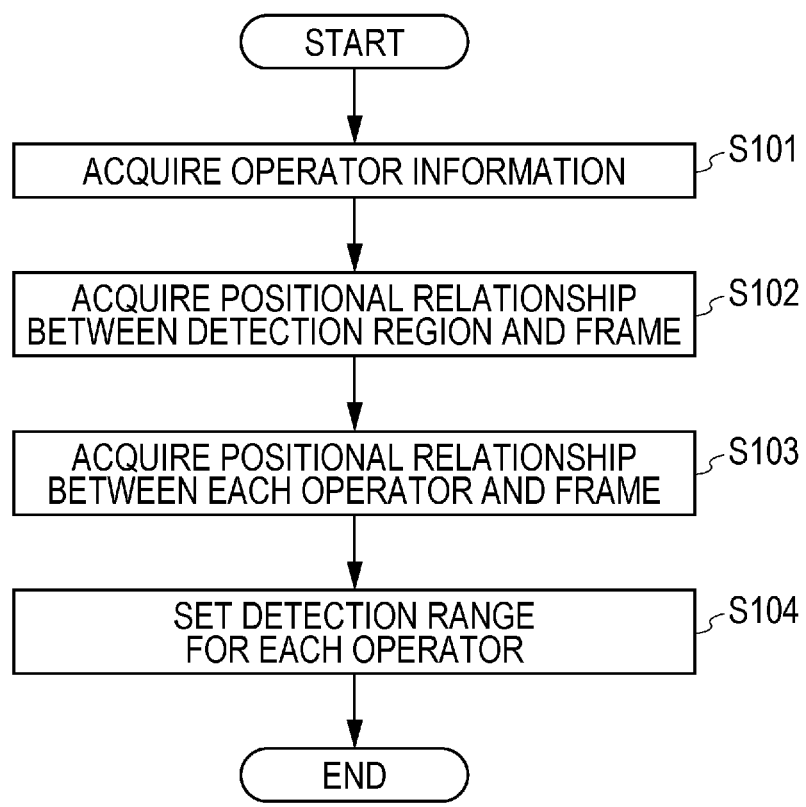
FIG. 5 is a flowchart illustrating an example of a detection-range setting operation executed by the operation-input-detection functional unit.

FIG. 5 is a flowchart illustrating an example of a detection-range setting operation executed by the operation-input-detection functional unit 351.

The operation-input-detection functional unit 351 executes the detection-range setting operation shown in FIG. 5 every time the display image displayed on the display unit 301 changes.

First, in step S101, the operator-information acquiring unit 352 acquires operator information.

Then, in step S102, the detection-range setting unit 353 acquires the positional relationship between the detection region of the operation receiving unit 302 and the frame. As mentioned above, in this exemplary embodiment, this positional relationship is predetermined. Step S102 may be performed prior to step S101.

Subsequently, in step S103, the detection-range setting unit 353 acquires the positional relationship between each operator and the frame. Although this will be described in detail later, the positional relationship between the position of each displayed operator and the frame is acquired.

Then, in step S104, the detection-range setting unit 353 sets the detection range for each operator. This setting process involves extending the detection range in a direction away from the frame relative to the position of a displayed target operator, so that an operator that is located at a position along the frame and that is normally difficult to operate may be readily operated.

In a case where the positions on the display screen are set in advance, detection-range information preset for each display image may simply be read instead of performing the procedure shown in FIG. 5.

The detection-range setting unit 353 sets the detection ranges in accordance with the display image when there is a change in the positional relationship between the rows and columns, as the operators, and the frame, such as when a list image is scrolled on the display screen.

Detection-Range Setting Example

Figure 6:
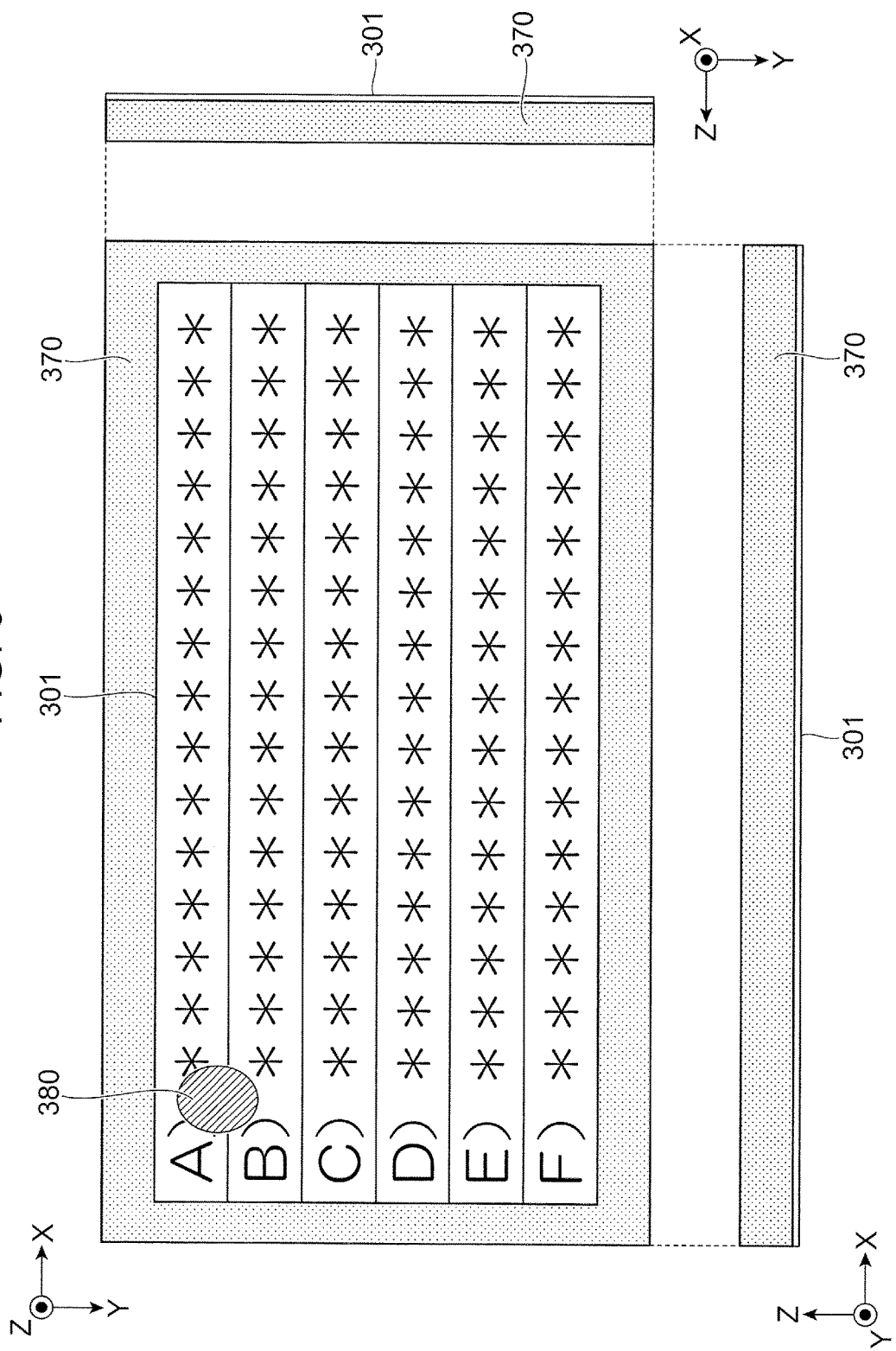
FIG. 6 illustrates the positional relationship between a display unit and a frame.

FIG. 6 illustrates the positional relationship between the display unit 301 and a frame 370.

In the case of FIG. 6, the frame 370 is disposed so as to surround the four outer edges of the display unit 301. The frame 370 is integrated with the housing. In FIG. 6, only a portion of the frame 370 that surrounds the display unit 301 is illustrated.

In the case of FIG. 6, in the display unit 301, a list of information about contact addresses A, B, C, . . . , and F is displayed in sequence from top to bottom on the display screen. The side at which the information about the contact address A is displayed is the upper side of the display image, whereas the side at which the information about the contact address F is displayed is the lower side of the display image.

In the case of FIG. 6, the display regions of the contact addresses A, B, C, . . . , and F respectively correspond to operators. The user may bring his/her fingertip into contact with the display region of the target contact address to be operated so as to command the user interface 300 that the display region of the target contact address is to be operated.

In FIG. 6, a position in contact with the fingertip (i.e., a command region 380) is indicated in an elliptical shape. As shown in FIG. 6, the command region 380 is deviated in a direction away from the frame 370. The reason for this deviation is because the user subconsciously tries to avoid touching the frame 370. This psychology of the user trying to avoid touching the frame 370 tends to become stronger as the step formed by the frame 370 increases in size. In the example in FIG. 6, the command region 380 extends astride the display region of the contact address A and the display region of the contact address B.

Supposing that the detection range for the contact address A matches the display region of the contact address A, it would be difficult for the operation detecting unit 354 to identify which one of the contact addresses is designated.

In contrast, in this exemplary embodiment, the detection ranges for multiple operators located near the upper side of the frame 370 are extended in a direction away from the upper side of the frame 370, and the extension amount is set to a larger value for each of the detection ranges that are closer to the upper side of the frame 370. This detection-range setting process is executed by the detection-range setting unit 353 (FIG. 4).

Figure 7:
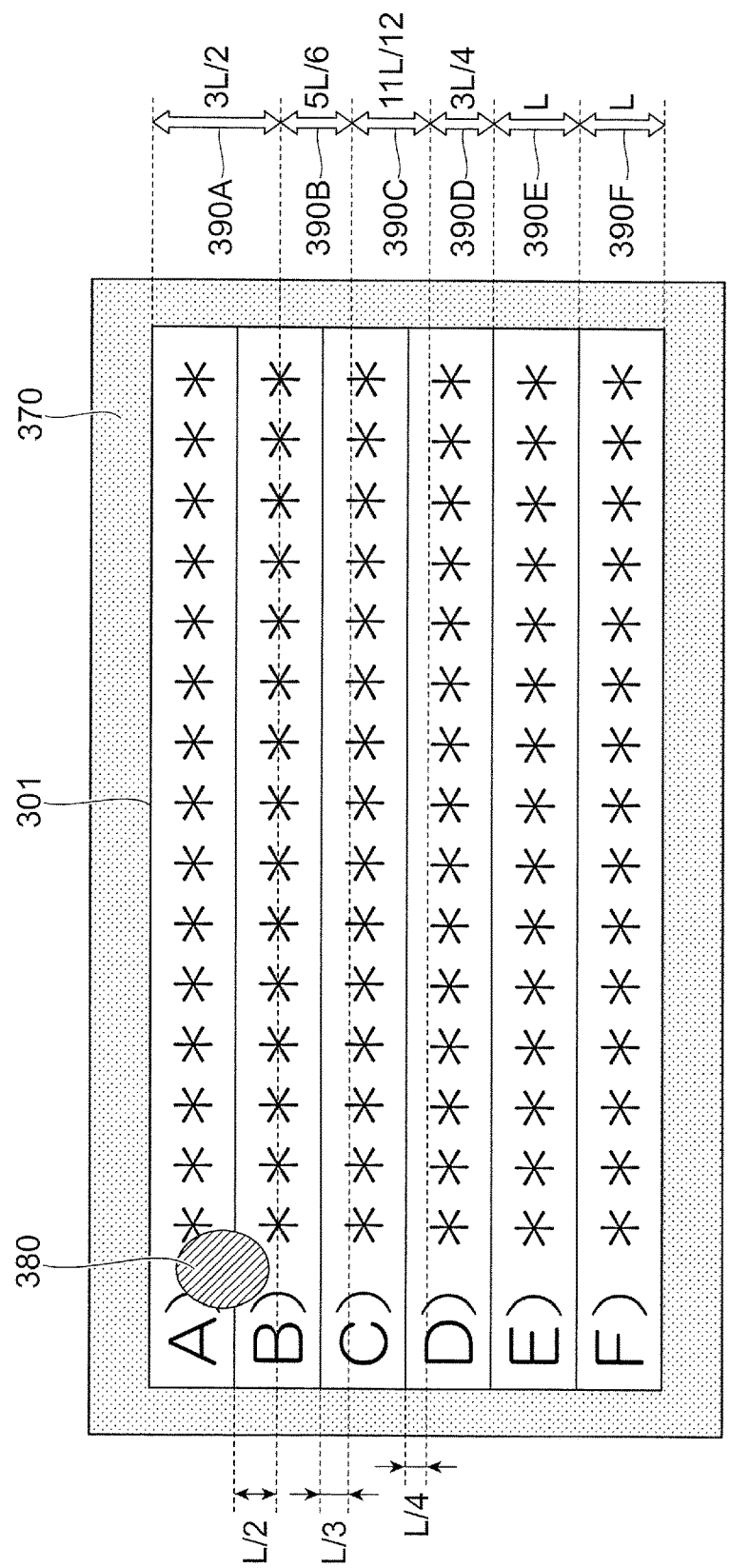
FIG. 7 illustrates a detection-range setting example in a case where a display image in the form of a list is displayed on the display unit.

FIG. 7 illustrates a detection-range setting example in a case where a display image in the form of a list is displayed on the display unit 301.

In FIG. 7, the widths of detection ranges corresponding to the contact addresses A, B, C, . . . , and F are indicated by double arrows 390A, 390B, 390C, . . . , and 390F.

In the case of FIG. 7, the detection ranges of the three contact addresses A, B, and C are extended in a direction away from the upper side of the display unit 301 (i.e., the upper side of the frame 370).

Assuming that the visible width of a contact address is defined as L, specific extension amounts for the contact addresses A, B, and C are L/2, L/3, and L/4, respectively. Specifically, the extension amount is set to be larger for a contact address located closer toward the upper side of the frame 370.

In this case, the extension amount is not a fixed value and is set based on the visible width L of each contact address as an operator displayed on the display unit 301. Therefore, the designation of each contact address may be detected with high accuracy without the width of the corresponding detection range being set independently of the visible width L of the contact address (i.e., without the display position of the visible contact address and the corresponding detection range excessively deviating from each other).

Because the display in the example in FIG. 7 is in the form of a list, the display regions of the contact addresses A, B, C, . . . , and F are displayed in a successive manner. Therefore, the detection ranges corresponding to the extended contact addresses A, B, and C partially overlap the display regions of the neighboring contact addresses B, C, and D. Thus, the widths of the detection ranges for the contact addresses A, B, C, . . . , and F are 3L/2 (=18L/12), 5L/6 (=10L/12), 11L/12, 3L/4 (=9L/12), L, and L, respectively, in that order.

Although the detection range for the contact address F is not extended in a direction away from the lower side of the frame 370 in the example in FIG. 7, the detection range may be extended similarly to the upper side. However, since an operation in which a fingertip moves over the frame 370 (protrusion), as in the case of the upper side, is not necessary at the lower side, there is a low possibility in which the command region 380 is mistakenly pressed against a target operator.

By setting the extension amount of the contact address A to L/2, the command region 380 is entirely fitted within the detection range for the contact address A in the example in FIG. 7.

Therefore, even if the command region 380 is deviated so as to extend astride the display region of the contact address A and the display region of the contact address B, the operation detecting unit 354 may detect that the contact address designated by the user is the contact address A, thereby facilitating the designating operation performed by the user.

In addition to the detection range for the contact address A (i.e., the operator located at the position along the upper side of the frame 370) where a misoperation is likely to occur, the detection ranges for the contact address B that is the second-closest to the upper side of the frame 370 and the contact address C that is the third-closest to the upper side of the frame 370 are extended in the direction away from the upper side of the frame 370 so as to gradually eliminate the deviation caused by the extension of the detection ranges. By gradually reducing the extension width in this manner, the deviation between the display position of each contact address and the detection range therefor may be reduced with increasing distance from the upper side of the frame 370.

Figure 8:
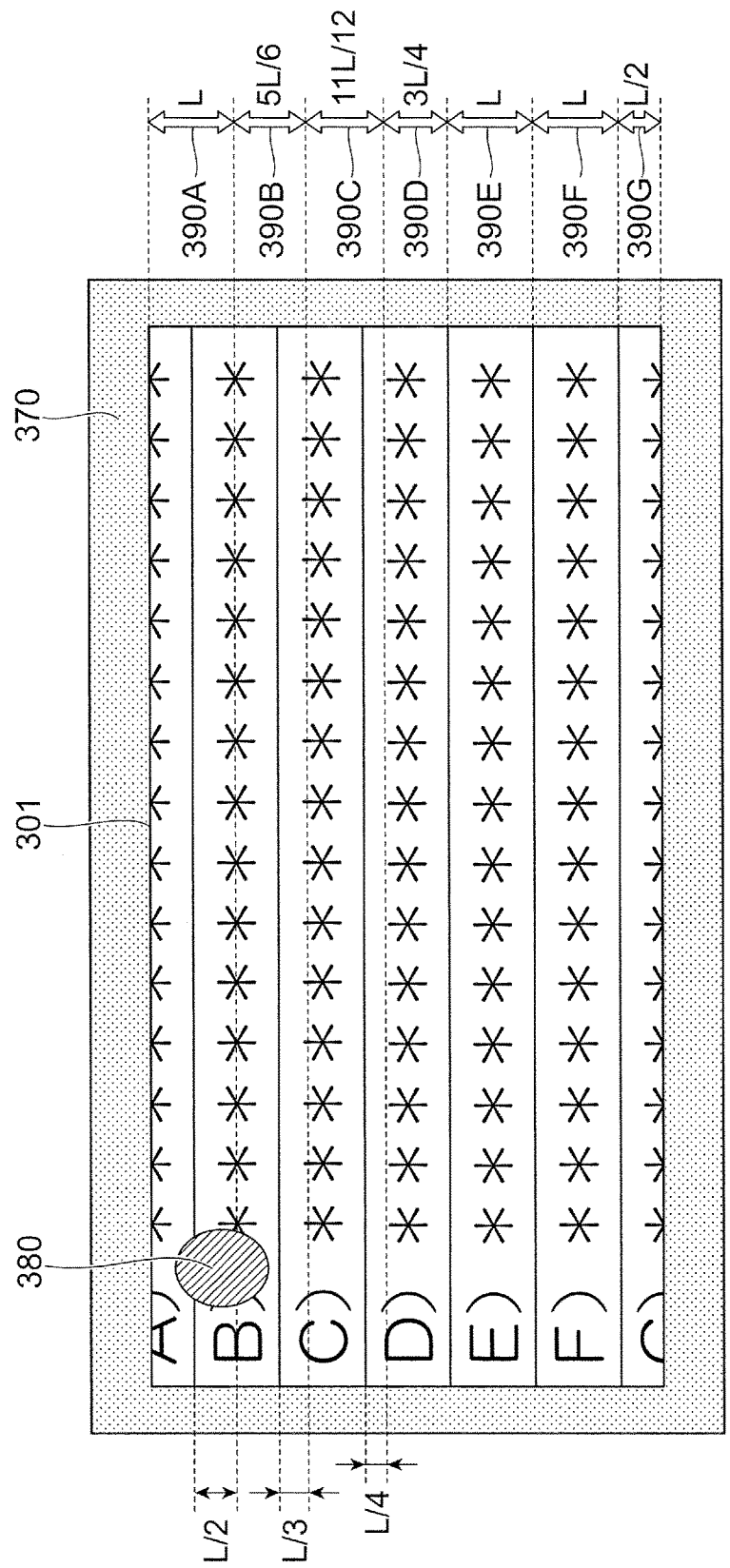
FIG. 8 illustrates another detection-range setting example in a case where a display image in the form of a list is displayed on the display unit.

FIG. 8 illustrates another detection-range setting example in a case where a display image in the form of a list is displayed on the display unit 301.

In the case of FIG. 8, the contents of the display screen displayed on the display unit 301 are deviated toward the upper side relative to the contents displayed in FIG. 7. The deviation amount is L/2 of the visible width of each contact address. Therefore, only the lower half of the contact address A is displayed at the upper side of the display unit 301, and only the upper half of the contact address G is displayed at the lower side of the display unit 301.

In this case, the detection-range setting unit 353 (FIG. 4) sets the detection ranges in accordance with the displayed contents (i.e., in accordance with the positions of the contact addresses as operators). Similar to the case in FIG. 7, the extension amounts of the detection ranges for the contact addresses A, B, and C are L/2, L/3, and L/4, respectively, in that order.

In the case of FIG. 8, the widths of the detection ranges corresponding to the contact addresses A, B, C, . . . , F, and G are L, 5L/6 (=10L/12), 11L/12, 3L/4 (=9L/12), L, L, and L/2, respectively, in that order.

Although the display width of the contact address A on the display screen is half its original width in this example, the user may readily operate the contact address A since the detection range is extended.

Accordingly, even when the display position or the display size of an operator changes on the display unit 301, the detection range for the contact address A as an operator at the position along the upper side of the frame 370 is extended, so that the contact address A that is located at the position along the upper side of the frame 370 and that is difficult to designate may be readily operated.

Although the extension widths of the detection ranges for the contact addresses A, B, and C as operators are set to L/2, L/3, and L/4 in the direction away from the upper side of the frame 370 in the examples in FIGS. 7 and 8, these values are merely examples.

Figure 9:
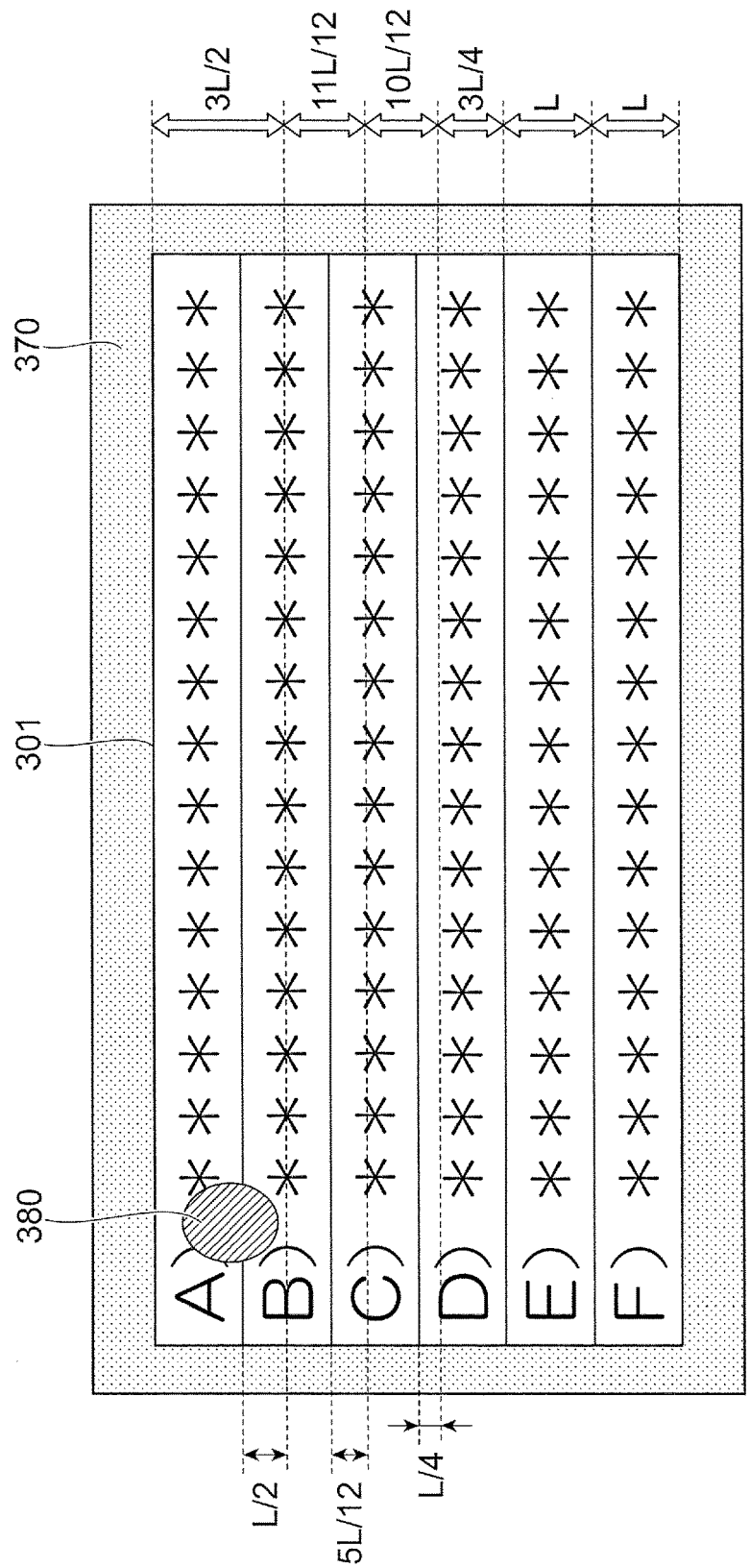
FIG. 9 illustrates another detection-range setting example in a case where a display image in the form of a list is displayed on the display unit.

FIG. 9 illustrates another detection-range setting example in a case where a display image in the form of a list is displayed on the display unit 301.

In the case of FIG. 9, the extension widths of the detection ranges for the contact addresses A, B, and C are set to L/2, 5L/12, and L/4, respectively.

In this case, the widths of the detection ranges corresponding to the contact addresses A, B, C, . . . , and F are 3L/2 (=18L/12), 11L/12, 10L/12, 3L/4 (=9L/12), L, and L, respectively, in that order, such that the widths of the detection ranges set for the contact addresses A, B, C, and D may vary in a continuously decreasing manner. In this case, the user's predictability with respect to the variation in the widths of the detection ranges increases, thereby enhancing the accuracy of the designating operation.

In the above description, the display image in the form of a list is displayed on the display unit 301. In a case where so-called software buttons are displayed, at least the detection ranges for software buttons displayed at positions along the frame 370 may be extended in a direction away from the frame 370, thereby facilitating the operation of the software buttons.

By using the detection-range extension technique described in this exemplary embodiment, regions that are difficult to designate may be reduced. As a result, the degree of freedom in the layout of the operators may be improved. For example, the operators may be reduced in size, as compared with the related art, or the operators may be displayed closer toward the frame 370 (protrusion).

Second Exemplary Embodiment

In the first exemplary embodiment, the positional relationship between the orientation of the display image displayed on the display unit 301 (i.e., the position of the upper side) and the frame 370 is fixed, as in the image forming apparatus 1. In this exemplary embodiment, this positional relationship is changeable.

Figure 10:
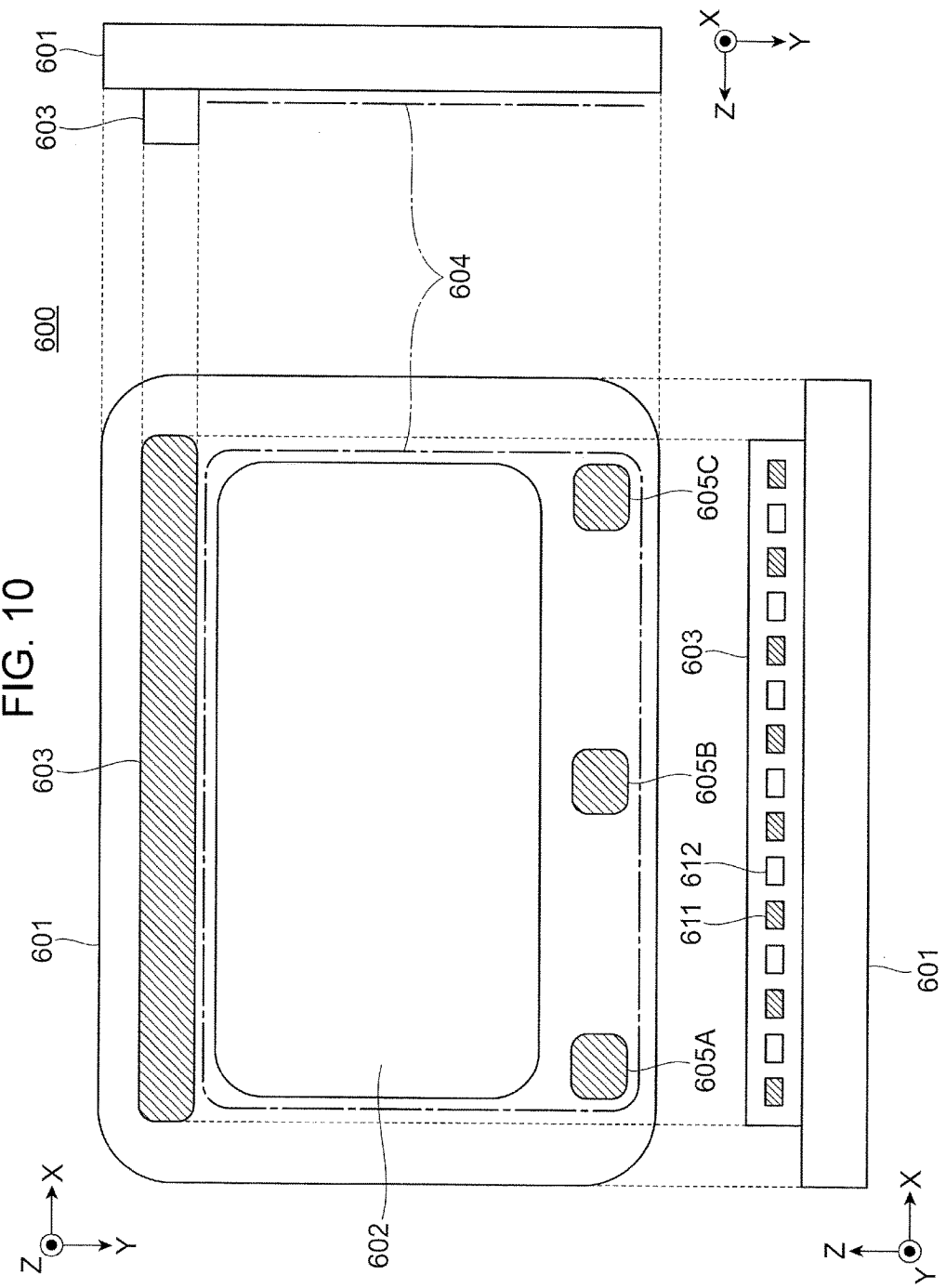
FIG. 10 is an external view of a tablet-type information terminal according to a second exemplary embodiment.

FIG. 10 is an external view of a tablet-type information terminal 600 according to a second exemplary embodiment.

The information terminal 600 is an example of an information processing apparatus. The information terminal 600 may be, for example, a smartphone or a gaming apparatus.

An upper surface of an apparatus body 601 of the information terminal 600 is provided with a display unit 602 that displays a display image and a coordinate detection sensor 603 that optically detects an operated position of an input object.

The coordinate detection sensor 603 is an example of a noncontact-type coordinate input device and is disposed so as to extend along one of the sides of the display unit 602. As shown in FIG. 10, the coordinate detection sensor 603 is installed so as to protrude from the upper surface of the apparatus body 601. In this example, the position where the coordinate detection sensor 603 is installed in the apparatus body 601 is fixed.

On a side surface of the coordinate detection sensor 603 provided with the display unit 602, light-emitting elements 611 that emit light and light-receiving elements 612 that receive light are alternately arranged, thereby forming a detection plane 604, which is parallel to the upper surface, in the space above the apparatus body 601. In this case, a housing of the coordinate detection sensor 603 that accommodates these optical components serves as an example of a protrusion.

In this exemplary embodiment, the light-emitting elements 611 are formed of, for example, light-emitting diodes (LEDs) that output infrared light. The light-receiving elements 612 are formed of, for example, photodiodes (PDs) that receive reflection light reflected from an input object (e.g., a finger or a pen) moving across the detection plane 604.

As shown in FIG. 10, the light-emitting elements 611 and the light-receiving elements 612 are alternately arranged in a line. The sizes and positions of the light-emitting elements 611 and the light-receiving elements 612 in FIG. 10 are enlarged for illustrative purposes. In actuality, the light-emitting elements 611 and the light-receiving elements 612 are arranged with the size and density according to the requested detection accuracy.

Figure 11:
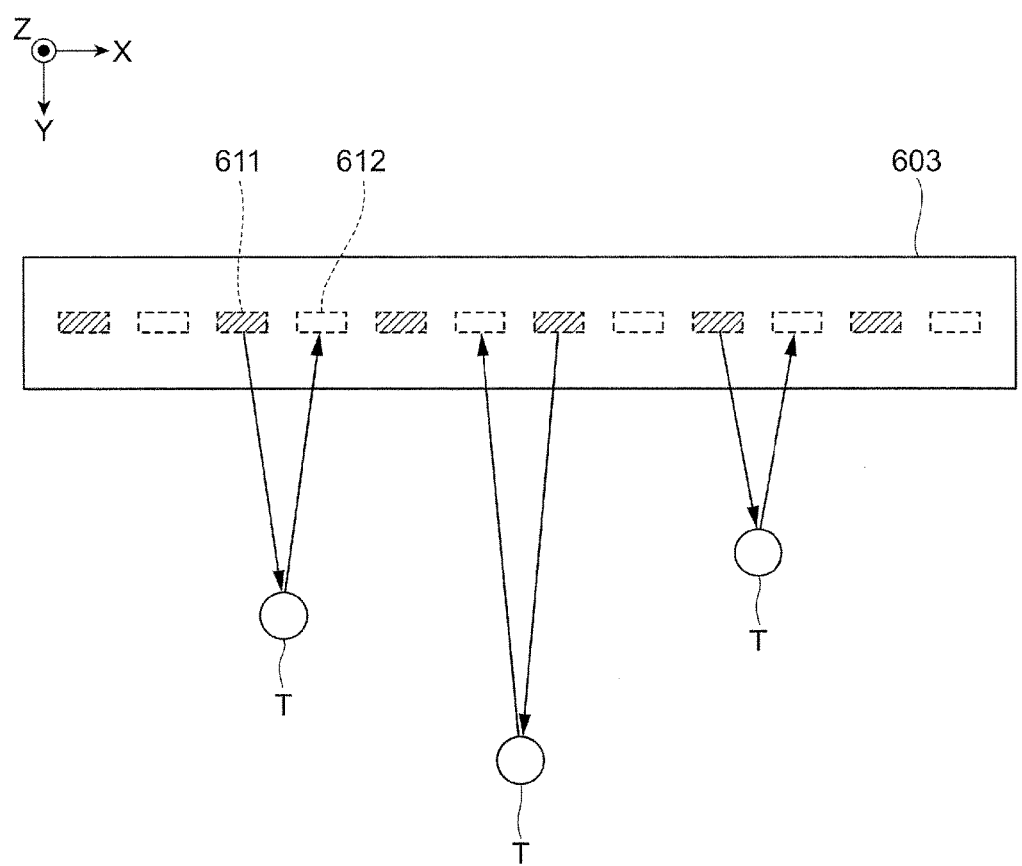
FIG. 11 illustrates how a coordinate detection sensor detects an input object.

FIG. 11 illustrates how the coordinate detection sensor 603 detects an input object T.

The coordinate detection sensor 603 used in this exemplary embodiment determines the position of the input object T in the direction in which the light-emitting elements 611 and the light-receiving elements 612 are arranged (i.e., an X-axis direction) in accordance with whether the reflection light from the input object T is detected by the light-receiving elements 612.

Moreover, the coordinate detection sensor 603 determines the position of the input object T in the direction away from the coordinate detection sensor 603 (i.e., a Y-axis direction) in accordance with the intensity of the light received by the light-receiving elements 612.

By utilizing the properties in which the intensity of the light received by the light-receiving elements 612 increases as the input object T moves toward the coordinate detection sensor 603 and the intensity of the light received by the light-receiving elements 612 decreases as the input object T moves away from the coordinate detection sensor 603, the coordinate detection sensor 603 determines the distance between the coordinate detection sensor 603 and the input object T.

The coordinate detection sensor 603 is capable of detecting multiple input objects T at once. Therefore, so-called multi-touch detection is possible.

Referring back to FIG. 10, because the coordinate detection sensor 603 used in this exemplary embodiment is of an optical type, the detection plane 604 is capable of detecting not only an operation input to an operator displayed on the display unit 602 but also an operation input to an icon (e.g., a back button 605A, a home button 605B, or a multitask button 605C) printed on the upper surface of the apparatus body 601.

These icons are an example of operators. The back button 605A is to be used as a command for, for example, returning the page screen displayed on the display unit 602 back to a preceding page. The home button 605B is to be used as a command for returning to a preregistered home screen. The multitask button 605C is to be used as a command for displaying a menu list or an application list.

Figure 12:
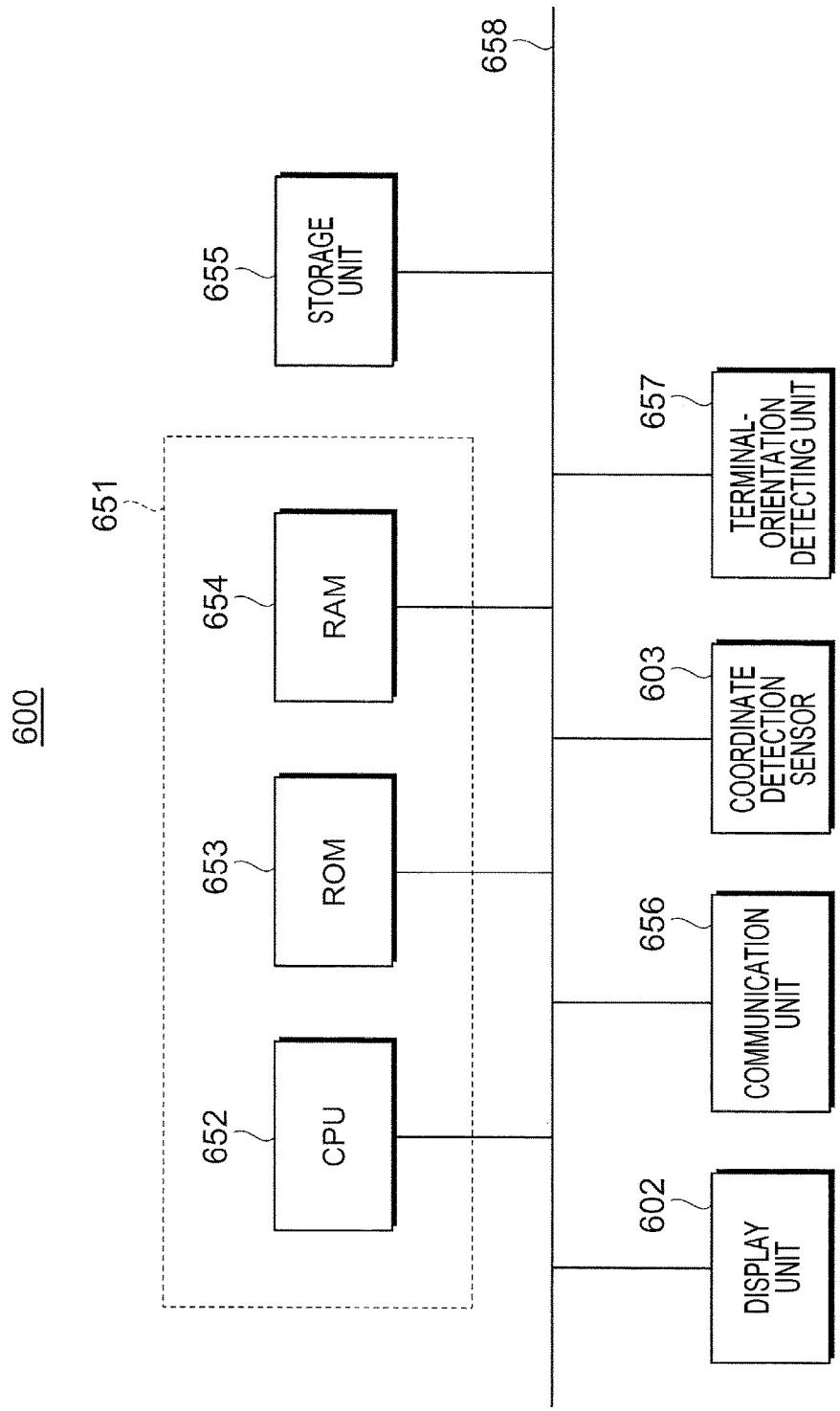
FIG. 12 illustrates an example of a functional block configuration of a controller and other devices constituting the information terminal.

The functions allocated to the icons are merely examples.
Hardware Configuration of Information Terminal FIG. 12 illustrates an example of a functional block configuration of a controller 651 and other devices constituting the information terminal 600.

The information terminal 600 has the controller 651 that controls the entire apparatus, the display unit 602 used for displaying an image, the coordinate detection sensor 603 that detects the coordinate position of an input object moving across the detection plane 604, a storage unit 655 used for storing various types of data and programs, a communication unit 656 used for communication with an external device, and a terminal-orientation detecting unit 657 that detects the orientation of the apparatus body 601 when in use.

These units are connected to one another by, for example, a bus 658 and exchange data via the bus 658.

The controller 651 includes a CPU 652, a ROM 653, and a RAM 654. The ROM 653 stores a program to be executed by the CPU 652. The CPU 652 uses the RAM 654 as a work area and executes the program read from the ROM 653. By executing the program, the units in the information terminal 600 are controlled.

The controller 651 in this exemplary embodiment provides the function of an input device together with the coordinate detection sensor 603.

The display unit 602 is formed of, for example, a liquid-crystal display panel or an organic electroluminescence (EL) display panel. In this exemplary embodiment, a contact-type coordinate input device, as in the first exemplary embodiment, is not provided.

The coordinate detection sensor 603 is integrally attached to the surface of the apparatus body 601.

The storage unit 655 is formed of a storage device, such as a hard disk device or a semiconductor memory.

The communication unit 656 is formed of, for example, a wireless local-area-network (LAN) interface.

The terminal-orientation detecting unit 657 includes, for example, an acceleration sensor and a geomagnetic sensor. In this exemplary embodiment, assuming that the side of the apparatus body 601 at which the coordinate detection sensor 603 is disposed is defined as an upper edge, the roll about the Y axis (see FIG. 10), the pitch about the X axis (see FIG. 10), and the azimuth about the Z axis (see FIG. 10) are detected.

The terminal-orientation detecting unit 657 uses the rotational information and azimuth information about these axes to detect which side of the apparatus body 601 is oriented vertically upward.
Operation-Input-Detection Functional Unit Next, an operation-input-detection functional unit according to this exemplary embodiment will be described. In this exemplary embodiment, the operation-input-detection functional unit is realized in accordance with cooperation among the controller 651 (CPU 652), the coordinate detection sensor 603, and the terminal-orientation detecting unit 657.

In this exemplary embodiment, the controller 651 functioning as an input device receives information related to the position and movement of an input object moving across the detection plane 604 (e.g., an output column of detection coordinates) from the coordinate detection sensor 603 and detects the contents of an operation input by a user based on the positional relationship with individual detection ranges allocated to operators (e.g., software buttons and icons) to be operated by the user.

In this exemplary embodiment, a maximum range of the detection plane 604 within which the coordinate detection sensor 603 may detect the coordinates (i.e., the input coordinates) of an input object is a detection region. The detection region includes individual detection ranges associated with the software buttons and icons.

Figure 13:
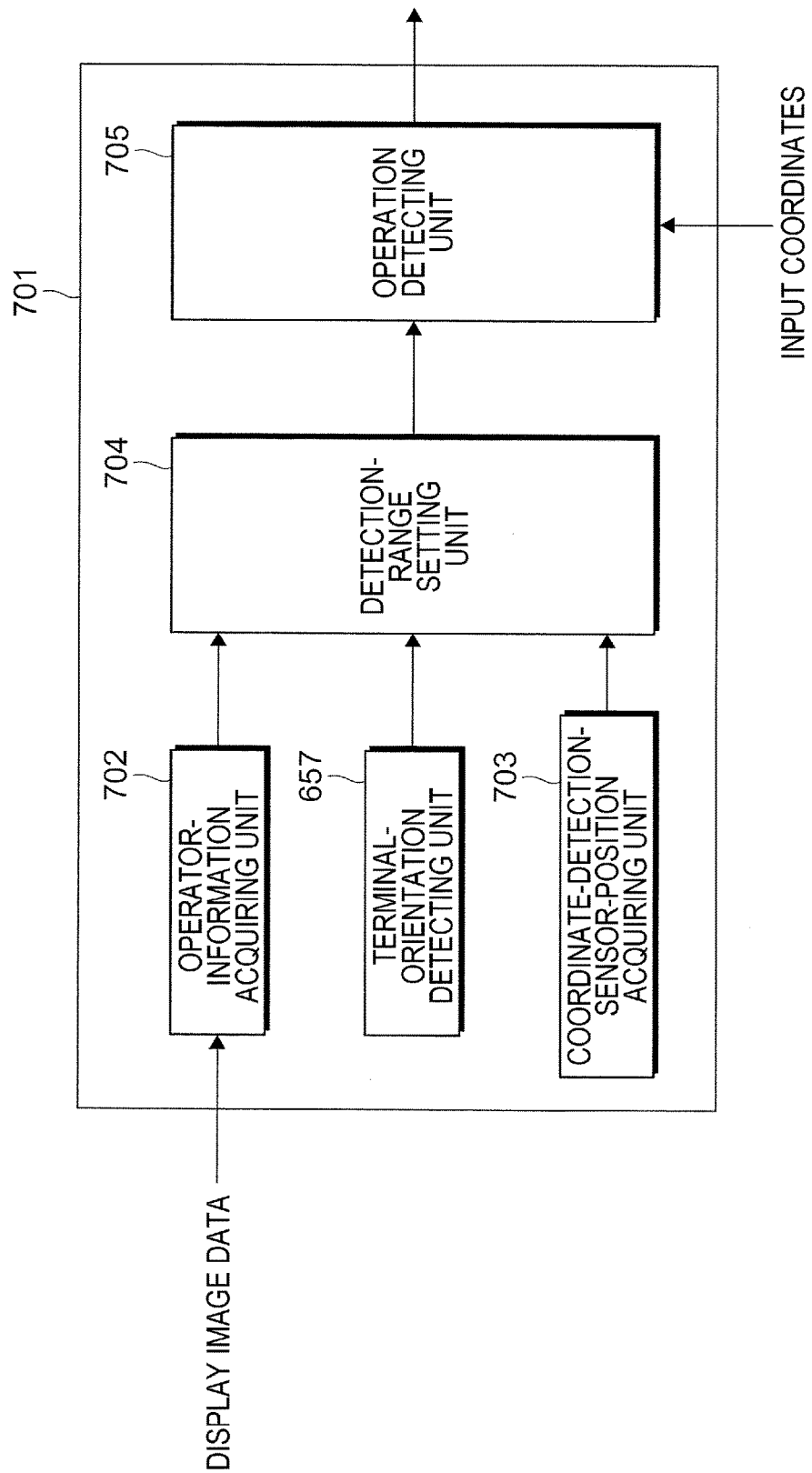
FIG. 13 illustrates an operation-input-detection functional unit used in the second exemplary embodiment.

FIG. 13 illustrates an operation-input-detection functional unit 701 used in the second exemplary embodiment.

An operator-information acquiring unit 702 acquires operator information about operators within the detection plane 604 based on display image data (such as information about a displayed page and layout information within a page) and positional information about icons 605A to 605C. The operator information contains, for example, the contents, the positions, and the display sizes of operators located within the detection region (i.e., the detection plane 604).

In a case where the rotating function of the display screen is enabled, the contents of the display image data input to the operator-information acquiring unit 702 are rotated in accordance with the orientation of the apparatus body 601 (i.e., the position of the upper side when the apparatus is in use) detected by the terminal-orientation detecting unit 657.

A coordinate-detection-sensor-position acquiring unit 703 acquires the positional relationship of the coordinate detection sensor 603 relative to the display unit 602.

A detection-range setting unit 704 sets the detection range for each operator on the screen based on the information from the terminal-orientation detecting unit 657, the operator information, and the positional relationship of the coordinate detection sensor 603. The contents of this setting process are basically the same as contents in which the positional relationship between the frame 370 and the operators in the first exemplary embodiment is replaced by the positional relationship between the coordinate detection sensor 603 and the operators. However, in this exemplary embodiment, the detection ranges are not defined at the display unit 602 but at the detection plane 604 of the coordinate detection sensor 603.

An operation detecting unit 705 detects an operation by comparing each set detection range with the coordinates (i.e., input coordinates) where an input object is detected.
Detection-Range Setting Example Examples in which detection ranges are set by the detection-range setting unit 704 will be described with reference to FIGS. 14 and 15.

Figure 14:
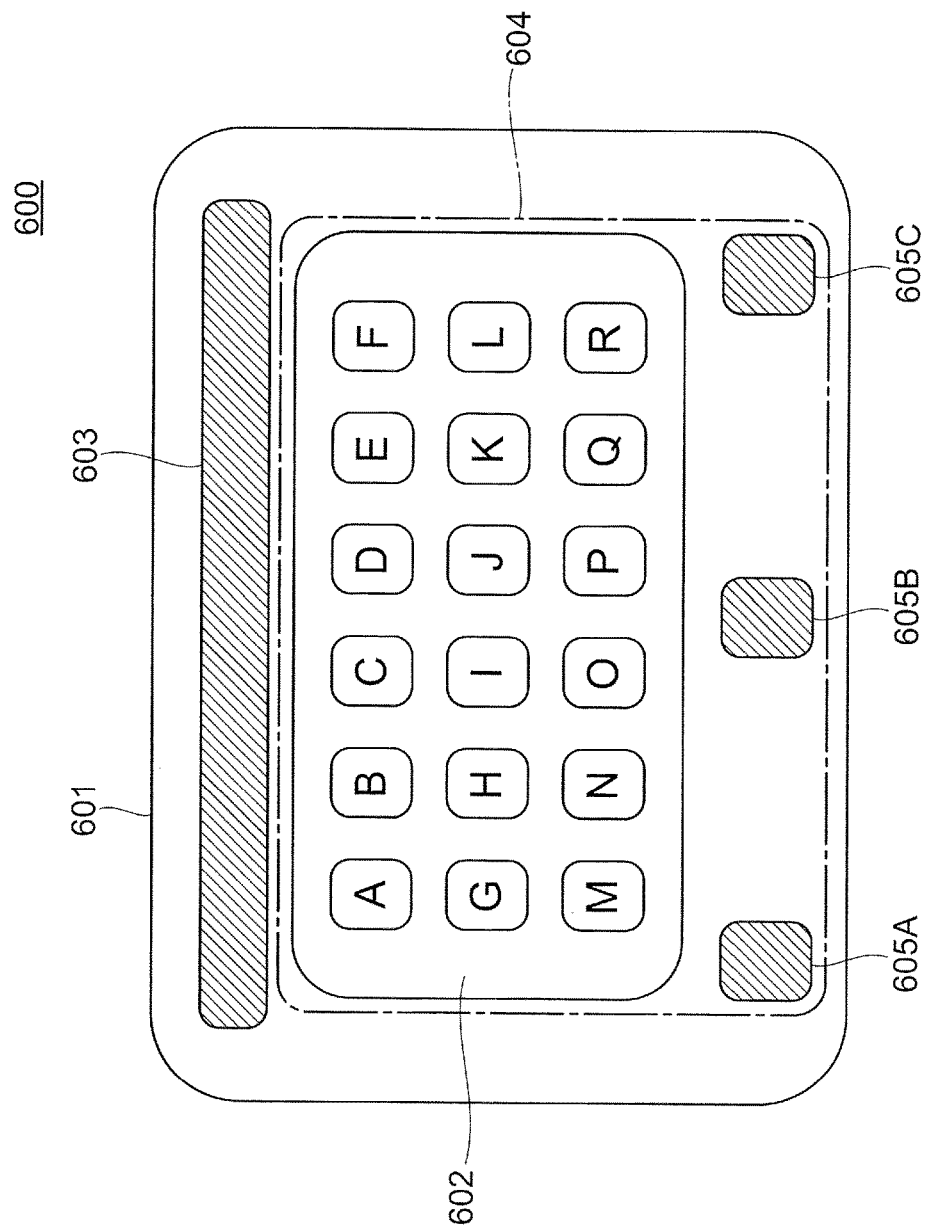
FIG. 14 illustrates a case where the coordinate detection sensor is located at the upper side of the display unit when the apparatus is in use.

FIG. 14 illustrates a case where the coordinate detection sensor 603 is located at the upper side of the display unit 602 when the apparatus is in use.

In the case of FIG. 14, the display unit 602 displays three rows of software buttons A to R in a direction away from the coordinate detection sensor 603. The software buttons A to F are displayed in the first row, the software buttons G to L are displayed in the second row, and the software buttons M to R are displayed in the third row. In the display example shown in FIG. 14, there are gaps between the rows, unlike the display in the form of a list (see FIG. 6). Alternatively, the software buttons may be arranged without gaps between the rows, similar to the display in the form of a list.

In this example, six software buttons displayed in the first row correspond to operators located near the coordinate detection sensor 603 as a protrusion. Therefore, the detection ranges for these six software buttons are extended in the direction away from the coordinate detection sensor 603 relative to the lower-edge position on the display. For example, the detection ranges are extended in the direction away from the coordinate detection sensor 603 by half the size of the buttons on the display. Furthermore, for example, for the six software buttons displayed in the second row, the detection ranges are extended in the direction away from the coordinate detection sensor 603 relative to the lower-edge position on the display by ⅓ of the size of the buttons on the display. For the six software buttons displayed in the third row, the detection ranges are extended in the direction away from the coordinate detection sensor 603 relative to the lower-edge position on the display by ¼ of the size of the buttons on the display.

In this exemplary embodiment, the extension amount of the detection range is increased for each of the software buttons that are closer to the coordinate detection sensor 603 so that even when the user subconsciously presses a position located away from the coordinate detection sensor 603, it may be detected that an intended software button has been operated. Moreover, even when the display screen of the software buttons is scrolled and the software buttons in the first row are only partially displayed, the detection ranges therefor are extended so that the software buttons in the first row may be readily operated.

Figure 15:
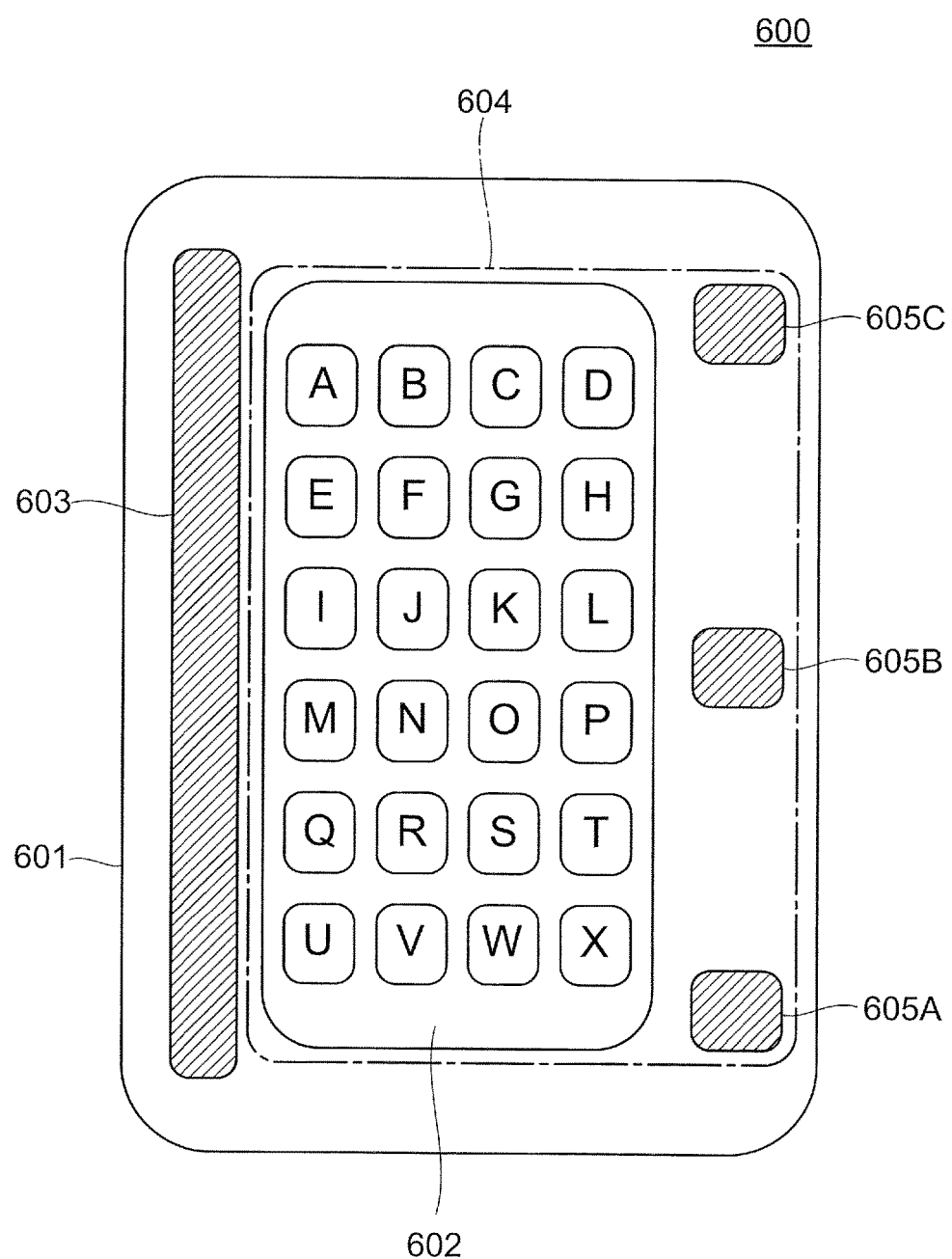
FIG. 15 illustrates a case where the coordinate detection sensor is located at the left side of the display unit when the apparatus is in use.

FIG. 15 illustrates a case where the coordinate detection sensor 603 is located at the left side of the display unit 602 when the apparatus is in use. The usage state shown in FIG. 15 corresponds to a case where the information terminal 600 is rotated counterclockwise from the usage state shown in FIG. 14.

In FIG. 15, the arrangement of the software buttons displayed on the display unit 602 is also changed in accordance with the rotation of the information terminal 600, such that four software buttons A to D are displayed in the first row of the display screen, software buttons E to H are displayed in the second row, software buttons I to L are displayed in the third row, and so on until the sixth row.

In this example, software buttons located near the coordinate detection sensor 603 are the software buttons A, E, I, M, Q, and U located in the first column from the left edge of the apparatus body 601. Therefore, these six software buttons correspond to operators located near the coordinate detection sensor 603 as a protrusion.

Therefore, the detection ranges for these six software buttons are extended in the direction away from the coordinate detection sensor 603 (i.e., toward the second column) relative to the right-edge position on the display. For example, the detection ranges are extended in the direction away from the coordinate detection sensor 603 by half the size of the buttons on the display. Furthermore, for example, for the six software buttons displayed in the second column, the detection ranges are extended in the direction away from the coordinate detection sensor 603 relative to the right-edge position on the display by ⅓ of the size of the buttons on the display. For the six software buttons displayed in the third column, the detection ranges are extended in the direction away from the coordinate detection sensor 603 relative to the right-edge position on the display by ¼ of the size of the buttons on the display.

Accordingly, even when the contents of software buttons displayed near the coordinate detection sensor 603 as a protrusion are changed in accordance with the rotation of the information terminal 600, the detection ranges for the individual software buttons are extended in accordance with the changed display contents, thereby realizing a terminal apparatus 600 in which software buttons located near the coordinate detection sensor 603 are readily operable.

Third Exemplary Embodiment

In the second exemplary embodiment, the operators located near the coordinate detection sensor 603 (FIG. 10) as a protrusion are software buttons displayed on the display unit 602. If the coordinate detection sensor 603 used is of an optical type, an operation input to each of the icons printed on the upper surface of the apparatus body 601 is also to be detected.

Figure 16:
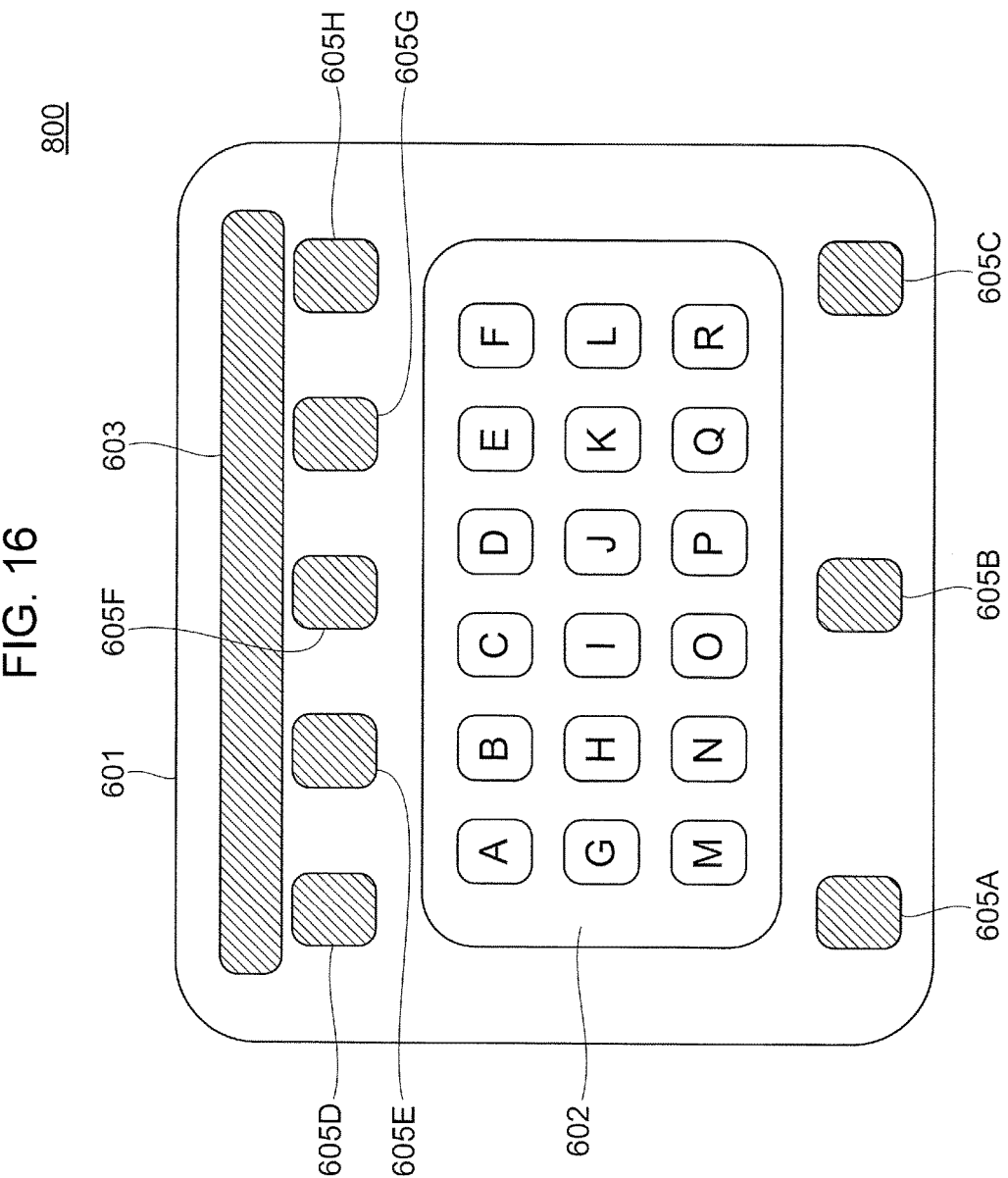
FIG. 16 is an external view of a tablet-type information terminal according to a third exemplary embodiment.

FIG. 16 is an external view of a tablet-type information terminal 800 according to a third exemplary embodiment. In FIG. 16, components corresponding to those in FIG. 10 are given the same reference signs. The information terminal 800 differs from the information terminal 600 (FIG. 10) in that icons 605D to 605H are printed on a housing surface between the display unit 602 and the coordinate detection sensor 603 and in that operations performed on these icons 605D to 605H are also to be detected.

With regard to the icons 605D to 605H, the only difference is whether the icons are displayed on the display unit 602 or are printed on the housing surface, and icons located near the coordinate detection sensor 603 tend to be difficult to operate. However, similar to the above-described exemplary embodiments, the ease of operation of each of these icons 605D to 605H may be improved by extending the detection range in the direction away from the coordinate detection sensor 603.

Furthermore, since the icons 605D to 605H do not have to be preliminarily arranged in a deviated manner in the direction away from the coordinate detection sensor 603 in view of operability thereof, the degree of freedom in the layout of the icons 605D to 605H is enhanced. Moreover, each detection range is extended to a size larger than or equal to the actual size, thereby enhancing the degree of design freedom, such as reducing the print size of each of the icons 605D to 605H.

Figure 17:
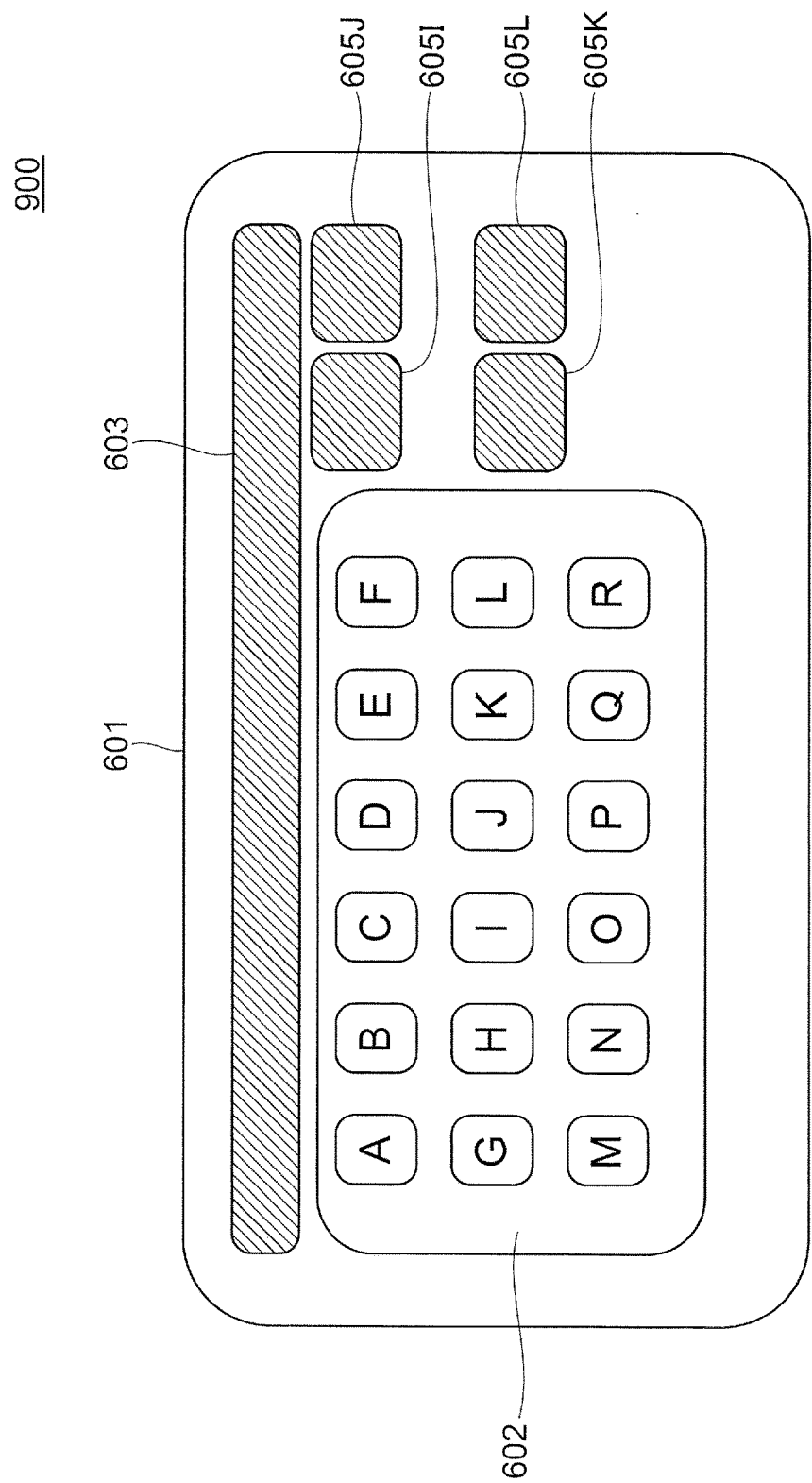
FIG. 17 illustrates another configuration example in which icons as operators are printed on a housing surface.

FIG. 17 illustrates another configuration example in which icons as operators are printed on the housing surface. In FIG. 17, components corresponding to those in FIG. 16 are given the same reference signs.

In a tablet-type information terminal 900 shown in FIG. 17, the coordinate detection sensor 603 is longer than the display unit 602, and icons 605I to 605L printed on the housing surface are included as targets to be detected.

In this example, there are eight operators located near the coordinate detection sensor 603, which are software buttons A to F displayed on the display unit 602 and the icons 605I and 605J.

In this case, the extension width of the detection range corresponding to each of the software buttons A to F and the extension width of the detection range corresponding to each of the icons 605I and 605J are set in accordance with the actual sizes thereof.

Fourth Exemplary Embodiment

In the above-described exemplary embodiments, the frame 370 (FIG. 6) and the coordinate detection sensor 603 (FIG. 10) as protrusions are both integrated with (fixed to) the apparatus body. In this exemplary embodiment, the coordinate detection sensor 603 is attachable to and detachable from the apparatus body.

Figure 18:
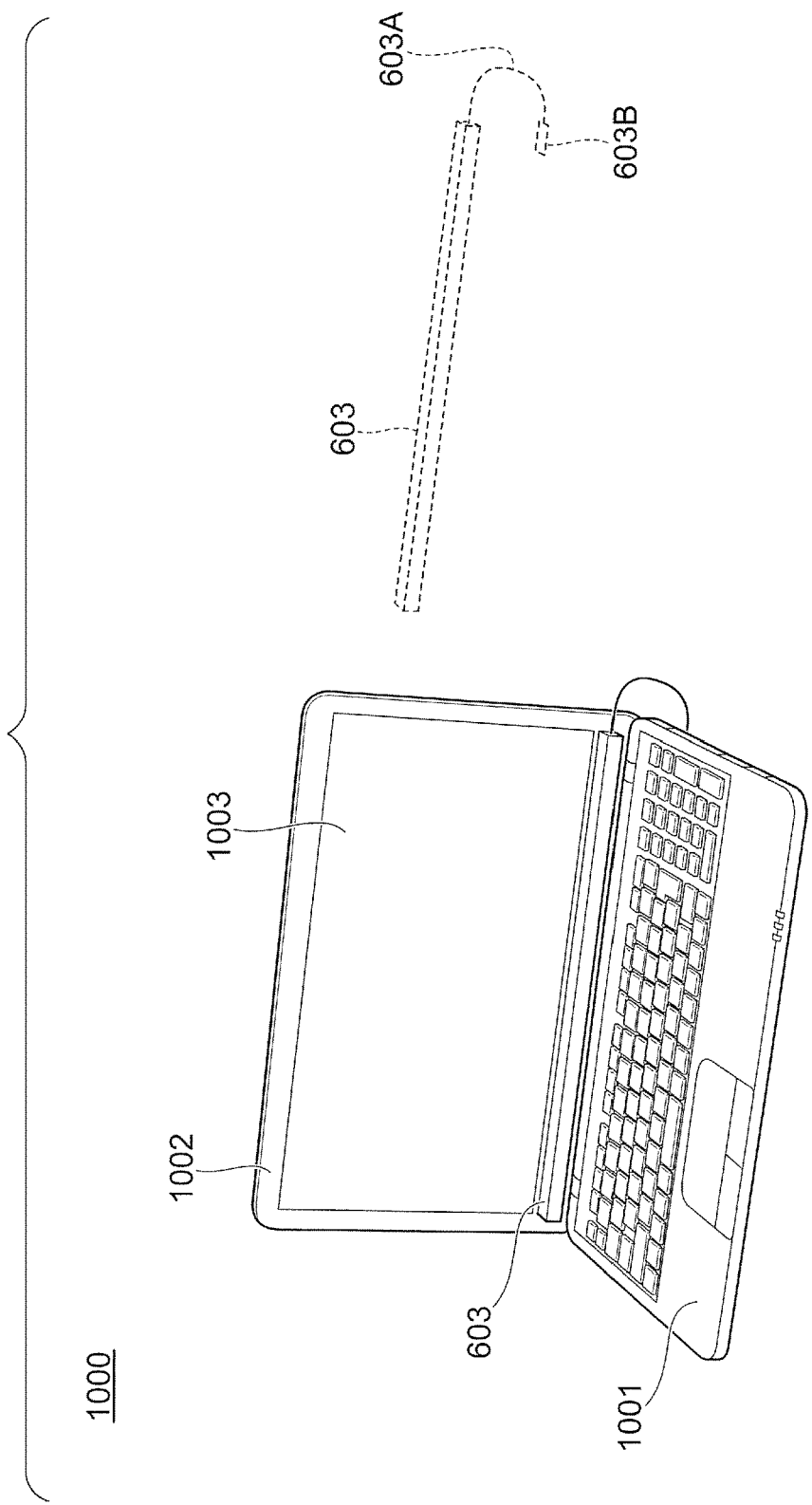
FIG. 18 is an external view of an information terminal, according to a fourth exemplary embodiment, to and from which the coordinate detection sensor is attachable and detachable.

FIG. 18 is an external view of an information terminal 1000, according to a fourth exemplary embodiment, to and from which the coordinate detection sensor 603 is attachable and detachable. In this example, the information terminal 1000 is a notebook-type computer. The information terminal 1000 has an apparatus body 1001 containing an electronic substrate and a hard disk device therein, and also has a cover 1002 in which a display unit 1003 is disposed.

In this exemplary embodiment, the coordinate detection sensor 603 is stored in an independent housing, and a connector 603B is attached to one end of the housing via a cable 603A. The connector 603B is for connecting to the apparatus body 1001 and is used for data communication as well as for feeding power from the apparatus body 1001.

Figure 19:
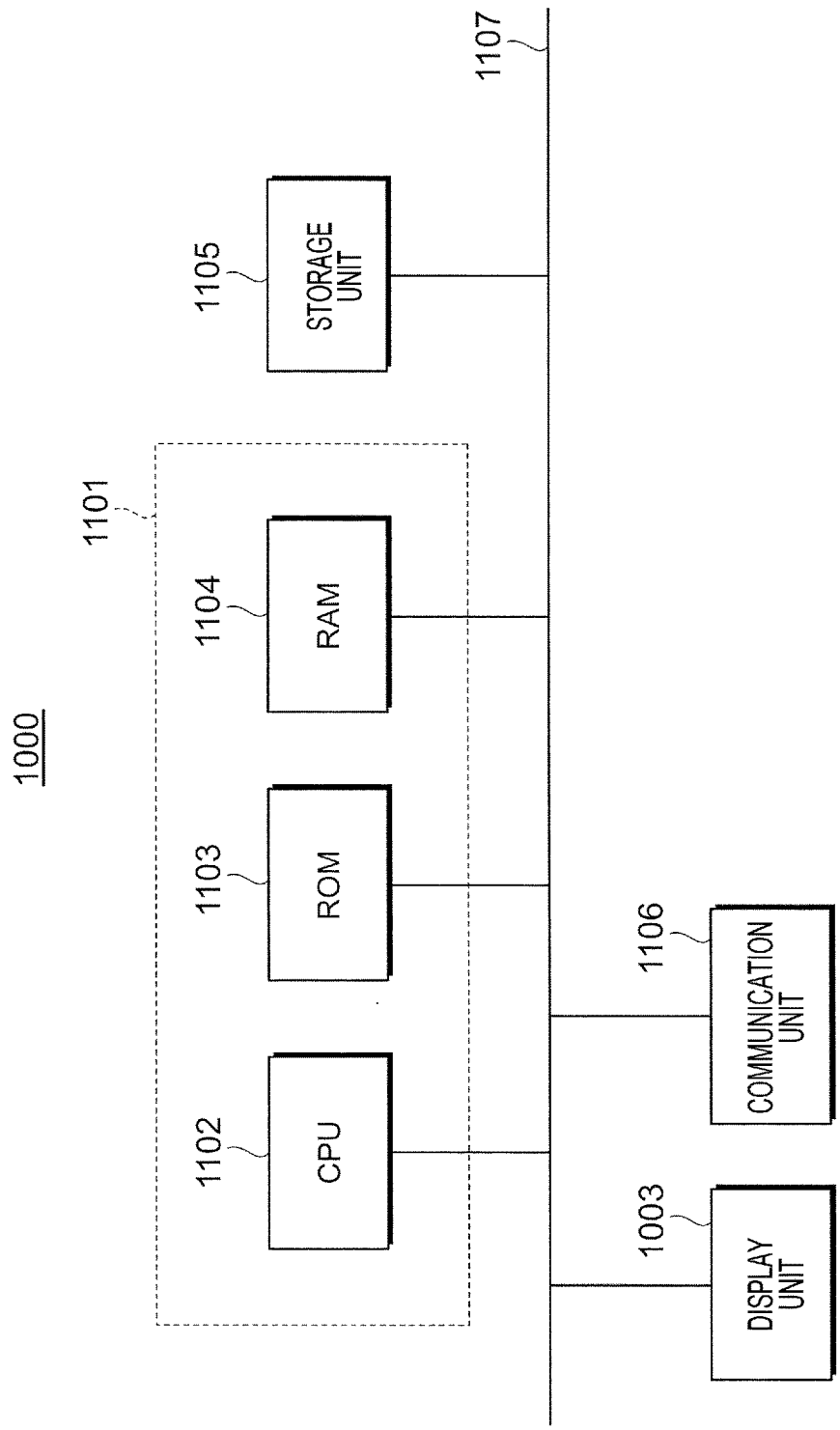
FIG. 19 illustrates an example of a functional block configuration of a controller and other devices constituting the information terminal.

FIG. 19 illustrates an example of a functional block configuration of a controller 1101 and other devices constituting the information terminal 1000. The information terminal 1000 has the controller 1101 that controls the entire apparatus, the display unit 1003 used for displaying an image, a storage unit 1105 used for storing various types of data and programs, and a communication unit 1106 used for communication with an external device (such as the coordinate detection sensor 603).

These units are connected to one another by, for example, a bus 1107 and exchange data via the bus 1107.

The controller 1101 includes a CPU 1102, a ROM 1103, and a RAM 1104. The ROM 1103 stores a program to be executed by the CPU 1102. The CPU 1102 uses the RAM 1104 as a work area and executes the program read from the ROM 1103. By executing the program, the units in the information terminal 1000 are controlled.

The controller 1101 in this exemplary embodiment provides the function of an input device together with the coordinate detection sensor 603.

Figure 20:
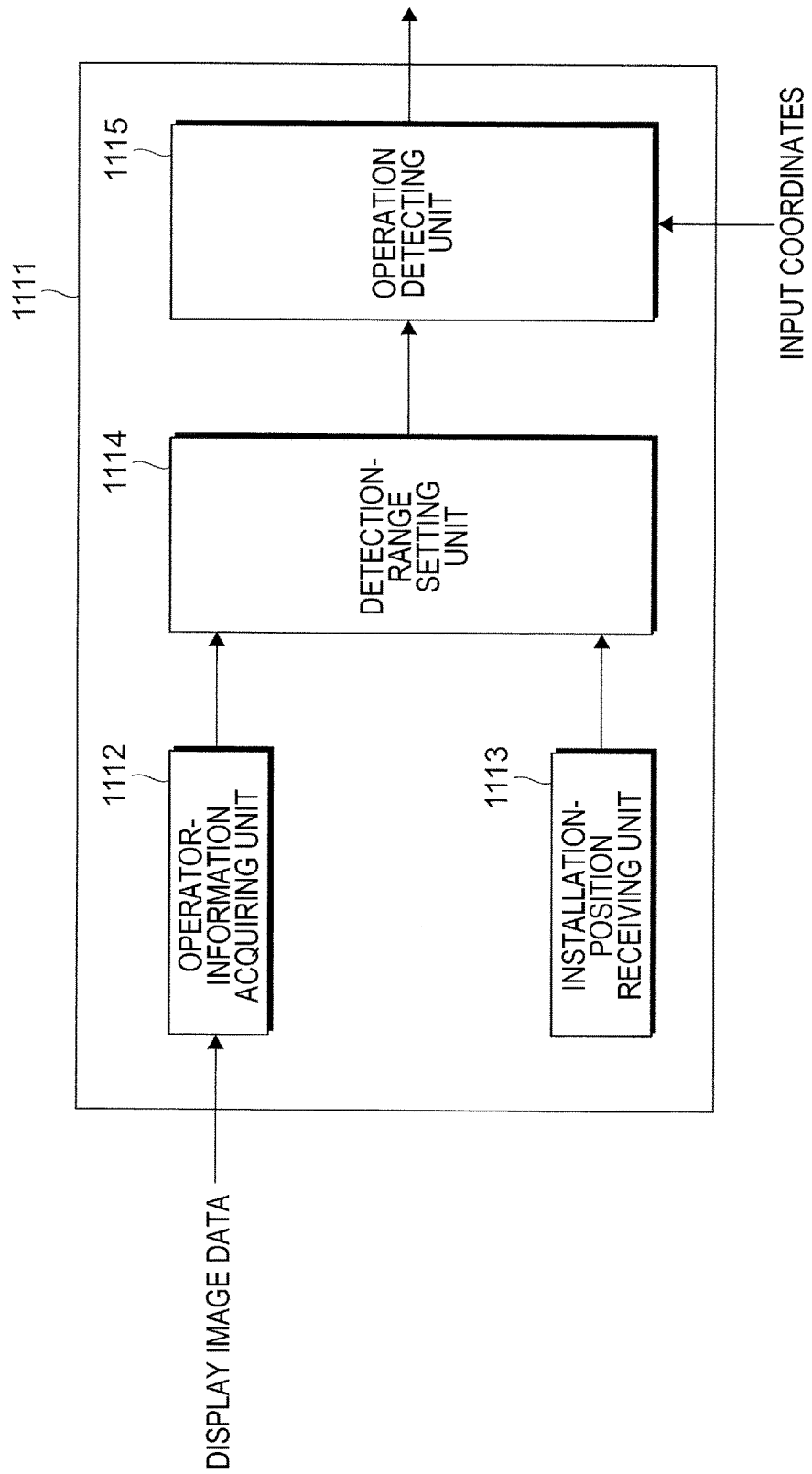
FIG. 20 illustrates an operation-input-detection functional unit used in the fourth exemplary embodiment.

FIG. 20 illustrates an operation-input-detection functional unit 1111 used in the fourth exemplary embodiment.

An operator-information acquiring unit 1112 acquires operator information to be displayed on the display unit 1003 based on display image data (such as information about a displayed page and layout information within a page). The operator information contains, for example, the contents, the positions, and the display sizes of operators located within the detection region (i.e., the detection plane 604).

An installation-position receiving unit 1113 provides a function of receiving the installation position of the coordinate detection sensor 603 and transmitting the installation position to a detection-range setting unit 1114.

Figure 21:
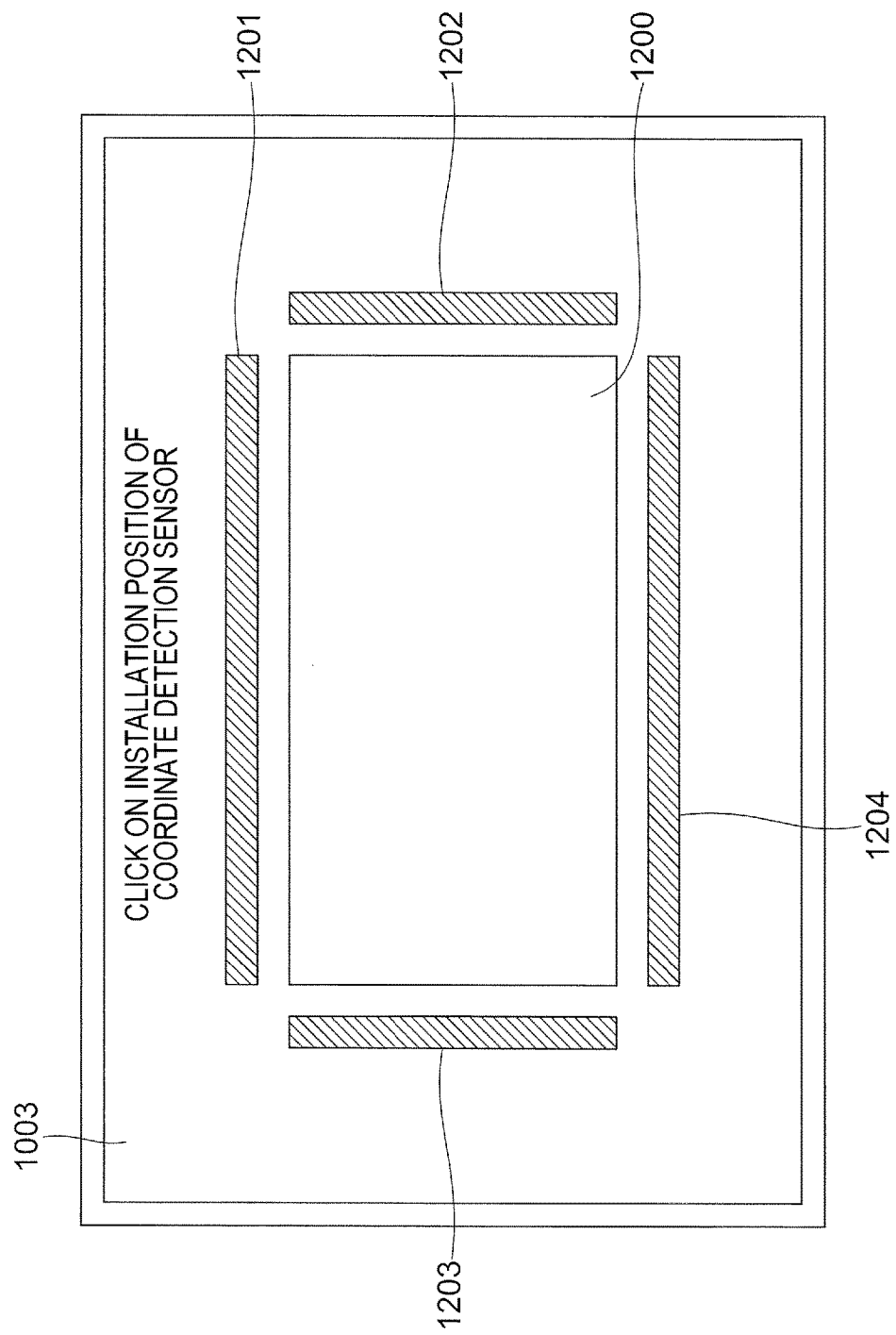
FIG. 21 illustrates an example of an interface screen displayed on the display unit for receiving the installation position of the coordinate detection sensor.

FIG. 21 illustrates an example of an interface screen displayed on the display unit 1003 for receiving the installation position of the coordinate detection sensor 603. In this interface screen, installation-position candidates 1201 to 1204 are disposed along the four sides of a rectangle 1200 indicating the position of the display unit 1003.

The installation-position candidate 1201 is disposed along the upper side of the rectangle 1200, the installation-position candidate 1202 is disposed along the right side of the rectangle 1200, the installation-position candidate 1203 is disposed along the left side of the rectangle 1200, and the installation-position candidate 1204 is disposed along the lower side of the rectangle 1200.

The installation-position receiving unit 1113 transmits, to the detection-range setting unit 1114, information about the position clicked by the user in accordance with a guidance message "click on installation position of coordinate detection sensor" on the interface screen.

In this exemplary embodiment, it is assumed that the coordinate detection sensor 603 may be disposed along any one of the four sides serving as the outer edges of the display unit 1003. If it is also assumed that the coordinate detection sensor 603 may be disposed along any one of the four sides serving as the outer edges of the apparatus body 1001, an interface screen used for designating an assumed installation location is prepared.

The detection-range setting unit 1114 sets the detection range for each operator on the screen based on the information from the installation-position receiving unit 1113 and the operator information. The contents of this setting process are basically the same as the contents in the second exemplary embodiment described above.

An operation detecting unit 1115 detects an operation by comparing each set detection range with the coordinates (i.e., input coordinates) where an input object is detected.

Accordingly, in this exemplary embodiment, even when the installation position of the coordinate detection sensor 603 on the apparatus body 1001 or the display unit 1003 changes, the operators, the detection ranges for which are to be extended, and the extension direction are changeable in accordance with the installation position.

Therefore, the operators located near the coordinate detection sensor 603 are readily operable regardless of the installation position of the coordinate detection sensor 603.

The coordinate detection sensor 603 has a height of, for example, 17 mm (i.e., height from the installation surface). This numerical value is merely an example and may be, for example, 10 mm or more. The same applies to the other protrusions described above.

Other Exemplary Embodiments

Although exemplary embodiments of the present invention have been described above, the technical scope of the invention is not to be limited to the scope defined in the above exemplary embodiments. It is obvious from the scope of the claims that various modifications and variations added to the above exemplary embodiments are included in the technical scope of the invention.

For example, although an operation performed on an operator displayed on the display unit 301 is detected by using a contact-type coordinate input device in the image forming apparatus 1 according to the first exemplary embodiment, the aforementioned contact-type coordinate input device may be replaced with a noncontact-type coordinate input device.

Furthermore, although an operation performed on an operator displayed on the display unit 301 is detected by using a noncontact-type coordinate input device in the second exemplary embodiment, a contact-type coordinate input device may be used.

In the above exemplary embodiments, the image forming apparatus 1 and the information terminals 600, 800, 900, and 1000 are exemplified as apparatuses to which the input device having the detection-range extension function is applied. Alternatively, the input device may be applied to, for example, a smartphone, a portable gaming apparatus, a navigation apparatus, a transport-ticket vending machine, a ticket vending machine, or an automatic teller machine.

What is claimed is:

1. An input device comprising:
a plurality of operators disposed in a visible state on an operation surface;
a protrusion disposed so as to protrude from the operation surface; and
a detector that detects an input of an operation performed on each of the operators when a detection position of an input object is included in a detection range set for each operator,
wherein the plurality of operators include a first operator disposed near the protrusion and a second operator disposed at a position farther away from the protrusion than the first operator, and
wherein a first extension amount by which the detection range for the first operator is extended in a direction away from the protrusion from a visible position of the first operator is set to be larger than a second extension amount by which the detection range for the second operator is extended in the direction away from the protrusion from a visible position of the second operator, and
wherein the first extension amount defines a region within which the detector detects the input of the operation performed on the first operator, and the second extension amount defines a region within which the detector detects the input of the operation performed on the second operator.

2. The input device according to claim 1,
wherein the first extension amount and the second extension amount are included in a plurality of extension amounts for the detection ranges, and the extension amounts for the detection ranges decrease as the corresponding first and second operators are located farther away from the protrusion.

3. The input device according to claim 2,
wherein the first extension amount and the second extension amount are included in a plurality of extension amounts for the detection ranges, and the extension amounts for the detection ranges are set in accordance with sizes of the first and second operators on the operation surface.

4. The input device according to claim 1,
wherein at least the detection range set for the first operator located near the protrusion partially overlaps a visible position of the second operator adjacent to the first operator in the direction away from the protrusion.

5. The input device according to claim 4,
wherein the first and second operators are displayed in a form of a list in the direction away from the protrusion.

6. The input device according to claim 1,
wherein the first operator located near the protrusion is displayed on a display screen.

7. The input device according to claim 6,
wherein the first extension amount and the second extension amount are included in a plurality of extension amounts for the detection ranges, and the extension amounts for the detection ranges are set in accordance with a layout of the first and second operators displayed on the display screen.

8. The input device according to claim 6,
wherein the first and second operators, the detection ranges for which are to be extended, are set in accordance with display contents of the display screen.

9. The input device according to claim 6,
wherein the first and second operators, the detection ranges for which are to be extended, are set in accordance with a positional relationship with the protrusion depending on rotation of a device body.

10. The input device according to claim 1,
wherein the first operator located near the protrusion is printed on a housing surface, and
wherein the detector optically detects an operation input to the first operator.

11. The input device according to claim 1,
wherein, when the protrusion is attachable to and detachable from a device body, the detector changes a target, the detection range for which is to be extended, in accordance with an installation position of the protrusion.

12. The input device according to claim 11,
wherein the installation position of the protrusion on the device body is received via a setting screen.

13. The input device according to claim 1,
wherein the protrusion is a structural body that accommodates the detector that optically detects an operation input to each of the first and second operators.

14. An image forming apparatus comprising:
an image forming unit that forms an image onto a recording medium;
a plurality of operators disposed in a visible state on an operation surface;
a protrusion disposed so as to protrude from the operation surface; and
a detector that detects an input of an operation performed on each of the operators when a detection position of an input object is included in a detection range set for each operator,
wherein the plurality of operators include a first operator disposed near the protrusion and a second operator disposed at a position farther away from the protrusion than the first operator, and
wherein a first extension amount by which the detection range for the first operator is extended in a direction away from the protrusion from a visible position of the first operator is set to be larger than a second extension amount by which the detection range for the second operator is extended in the direction away from the protrusion from a visible position of the second operator, and wherein the first extension amount defines a region within which the detector detects
the input of the operation performed on the first operator, and the second extension amount defines a region within which the detector detects the input of the operation performed on the second operator.

15. A non-transitory computer readable medium storing a program causing a computer to execute a process when a plurality of operators disposed in a visible state at positions along a protrusion disposed so as to protrude from an operation surface, the process comprising:
detecting an input of an operation performed on each of the operators when a detection position of an input object is included in a detection range set for each operator; and setting a first extension amount by which the detection range for a first operator is extended in a direction away from the protrusion from a visible position of the first operator to be larger than a second extension amount by which the detection range for a second operator is extended in the direction away from the protrusion from a visible position of the second operator, wherein the first operator is included in the plurality of operators and is disposed near the protrusion, the second operator being included in the plurality of operators and being disposed at a position farther away from the protrusion than the first operator, and wherein the first extension amount defines a region within which the detector detects the input of the operation performed on the first operator, and the second extension amount defines a region within which the detector detects the input of the operation performed on the second operator.

* * * * *